(12) United States Patent
Mou et al.

(10) Patent No.: US 12,102,849 B2
(45) Date of Patent: *Oct. 1, 2024

(54) HELMET

(71) Applicant: MICROJET TECHNOLOGY CO., LTD., Hsinchu (TW)

(72) Inventors: Hao-Jan Mou, Hsinchu (TW); Yung-Lung Han, Hsinchu (TW); Chi-Feng Huang, Hsinchu (TW); Chin-Wen Hsieh, Hsinchu (TW); Tsung-I Lin, Hsinchu (TW); Yang Ku, Hsinchu (TW); Yi-Ting Lu, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 758 days.

This patent is subject to a terminal disclaimer.

(21) Appl. No.: 17/249,764

(22) Filed: Mar. 12, 2021

(65) Prior Publication Data
US 2021/0283432 A1 Sep. 16, 2021

(30) Foreign Application Priority Data
Mar. 13, 2020 (TW) ................. 109108471

(51) Int. Cl.
*A62B 18/04* (2006.01)
*A42B 3/28* (2006.01)
(Continued)

(52) U.S. Cl.
CPC ............ *A62B 18/045* (2013.01); *A42B 3/288* (2013.01); *A62B 7/10* (2013.01); *A62B 7/12* (2013.01);
(Continued)

(58) Field of Classification Search
CPC ........... A62B 18/045; A62B 7/10; A62B 7/12; A62B 9/00; A62B 9/006; A62B 9/02;
(Continued)

(56) References Cited

U.S. PATENT DOCUMENTS 11,772,029 B2 * 10/2023 Mou .................. F24F 8/10 96/16
12,025,343 B2 * 7/2024 Mou .................. F24F 8/108
(Continued)

FOREIGN PATENT DOCUMENTS

CN 105901819 A * 8/2016
CN 207855113 U 9/2018
(Continued)

*Primary Examiner* — Justine R Yu
*Assistant Examiner* — Matthew R Moon
(74) *Attorney, Agent, or Firm* — McClure, Qualey & Rodack, LLP

(57) ABSTRACT

A helmet includes a helmet body and a gas detection and purification device. The gas detection and purification device in includes a body, a purification module, a gas-guiding unit, a gas detection module, and a power module. The gas detection module calculates the gas detection data obtained by the gas detection module so as to control the gas-guiding unit to start or stop operation based on the gas detection data. When the gas-guiding unit is in operation, the gas-guiding unit guides the gas into the body and to pass through the purification module for being filtered and purified to become a purified gas, and the gas-guiding unit discharges the purified gas out of the body to the nose portion, or the mouth portion, or both the nose portion and the mouth portion of the wearer for providing the wearer with the purified gas to breath.

19 Claims, 35 Drawing Sheets

(51) Int. Cl.

| | | |
|---|---|---|
| *A62B 7/10* | (2006.01) | |
| *A62B 7/12* | (2006.01) | |
| *A62B 9/00* | (2006.01) | |
| *A62B 9/02* | (2006.01) | |
| *A62B 18/08* | (2006.01) | |
| *A62B 18/10* | (2006.01) | |
| *A62B 23/02* | (2006.01) | |
| *B01D 46/00* | (2022.01) | |
| *B01D 46/44* | (2006.01) | |
| *B01D 53/00* | (2006.01) | |
| *B01D 53/04* | (2006.01) | |
| *B01D 53/30* | (2006.01) | |
| *B01D 53/88* | (2006.01) | |
| *B03C 3/32* | (2006.01) | |
| *B03C 3/41* | (2006.01) | |
| *B03C 3/47* | (2006.01) | |

(52) U.S. Cl.
 CPC ............... *A62B 9/00* (2013.01); *A62B 9/006* (2013.01); *A62B 9/02* (2013.01); *A62B 18/08* (2013.01); *A62B 18/10* (2013.01); *A62B 23/02* (2013.01); *B01D 46/0028* (2013.01); *B01D 46/442* (2013.01); *B01D 53/007* (2013.01); *B01D 53/04* (2013.01); *B01D 53/30* (2013.01); *B01D 53/885* (2013.01); *B03C 3/32* (2013.01); *B03C 3/41* (2013.01); *B03C 3/47* (2013.01); *B01D 2253/102* (2013.01); *B01D 2255/802* (2013.01); *B01D 2257/91* (2013.01); *B01D 2259/804* (2013.01); *B01D 2279/40* (2013.01); *B03C 2201/04* (2013.01)

(58) Field of Classification Search
 CPC ......... A62B 18/08; A62B 18/10; A62B 23/02; A42B 3/288; A42B 3/046
 See application file for complete search history.

(56) References Cited

U.S. PATENT DOCUMENTS

| | | | |
|---|---|---|---|
| 2011/0086118 A1* | 4/2011 | Kim ....................... | B01D 53/34 424/769 |
| 2017/0136270 A1* | 5/2017 | Son ........................ | B01D 53/32 |
| 2018/0059079 A1* | 3/2018 | Meng ................... | G01N 33/0006 |
| 2019/0175411 A1* | 6/2019 | Awiszus ................ | G02F 1/13318 |

FOREIGN PATENT DOCUMENTS

| | | | | |
|---|---|---|---|---|
| CN | 109395477 A | * | 3/2019 | |
| CN | 209069775 U | | 7/2019 | |
| CN | 209573351 U | | 11/2019 | |
| CN | 110732206 A | | 1/2020 | |
| EP | 3473941 A1 | * | 4/2019 | ............ A61L 9/205 |
| TW | M567364 U | * | 9/2018 | |
| TW | M581748 | | 8/2019 | |
| TW | M581748 U | | 8/2019 | |
| TW | I686147 B | | 3/2020 | |
| WO | WO-2018112507 A1 | * | 6/2018 | ............ A61L 9/048 |
| WO | 2019183200 A1 | | 9/2019 | |

* cited by examiner

HELMET

CROSS-REFERENCE TO RELATED APPLICATION

This non-provisional application claims priority under 35 U.S.C. § 119 (a) to patent application Ser. No. 10/910,8471 filed in Taiwan, R.O.C. on Mar. 13, 2020, the entire contents of which are hereby incorporated by reference.

BACKGROUND

Technical Field

The present disclosure relates to a helmet. In particular, to a helmet combining with a gas detection and purification device.

Related Art

At present, people pay more and more attention to monitoring ambient air quality in daily life, such as monitoring carbon monoxide, carbon dioxide, volatile organic compounds (VOC), PM2.5, nitric oxide, sulfur monoxide, and even micro particles present in the ambient air. Moreover, even exposure to these gases can cause adverse effects on the human health, and can even be life-threatening. Although a motorcyclist wears a helmet during driving, the motorcyclist still can be directly affected by the air quality in the environment. Therefore, the air quality is still very important to the motorcyclist. How to monitor the air quality in the environment and purify the harmful substances in the air so as to allow the motorcyclist to breathe clean air as riding the motorcycle becomes an issue of concern currently.

Furthermore, if the detection information can be provided in real time during monitoring the air quality of the environment to warn people in a dangerous environment, so they can avoid or escape in time from the adverse effects on health and/or injuries caused by exposing to the harmful gas in the ambient environment, it would be helpful for the motorcyclists.

SUMMARY

One object of the present disclosure is providing a helmet that can be combined with a gas detection and purification device. The gas detection and purification device detects and purifies the gas, guides the purified gas into the helmet body, and discharges the purified gas to the area around nose portion and/or the area around the mouth portion of the wearer so that the wearer can breathe the purified gas directly. The gas detection module of the gas detection and purification device can detect the gas inside the helmet body to obtain a gas detection data, and the gas detection module controls the gas-guiding unit to start or stop a gas purification operation based on the gas detection data. The gas detection module further transmits the gas detection data to an external device, so that the external device obtains information and sounds a notification alert based on the gas detection data. Therefore, when the helmet is worn by a wearer, the gas can be detected and purified at anytime and anywhere, so as to provide the wearer with purified and clean air to breathe.

A general embodiment of the present disclosure provides a helmet. The helmet includes a helmet body and a gas detection and purification device. The helmet body has a front edge portion corresponding to a nose portion and/or a mouth portion of a wearer. The gas detection and purification device is disposed on the front edge portion of the helmet body. The gas detection and purification device includes a body, a purification module, a gas-guiding unit, a gas detection module, and a power module. The body has at least one gas inlet, at least one gas outlet, and a gas channel disposed in the body, wherein the gas channel is disposed between the at least one gas inlet and the at least one gas outlet. The purification module disposed in the gas channel of the body for filtering gas introduced into the body from the gas channel. The gas-guiding unit is disposed adjacently to the purification module in the gas channel, so as to introduce the gas to enter into the purification module from the gas inlet for filtering and purifying and to discharge the purified gas through the gas outlet. The gas detection module disposed in the body includes a gas detection main body for detecting the gas introduced into the body from the gas inlet to obtain a gas detection data. The power module disposed in the body is electrically connected to the gas detection module and the gas-guiding unit so as to provide actuating power. The gas detection module calculates the gas detection data obtained by the gas detection module so as to start or stop the operation of gas-guiding unit. When the gas-guiding unit is in operation, the gas-guiding unit guides the gas into and to pass through the purification module for being filtered and purified, and the gas is discharged from the gas outlet and to an area around the nose portion and/or an area around the mouth portion of the wearer for providing the wearer with the purified gas to breath.

BRIEF DESCRIPTION OF THE DRAWINGS

The disclosure will become more fully understood from the detailed description given herein below for illustration only, and thus not limitative of the disclosure, wherein.

DETAILED DESCRIPTION

The present disclosure will now be described more specifically with reference to the following embodiments. It is to be noted that the following descriptions of different embodiments of this disclosure are presented herein for purpose of illustration and description only, and it is not intended to limit the scope of the present disclosure.

Figure 1:
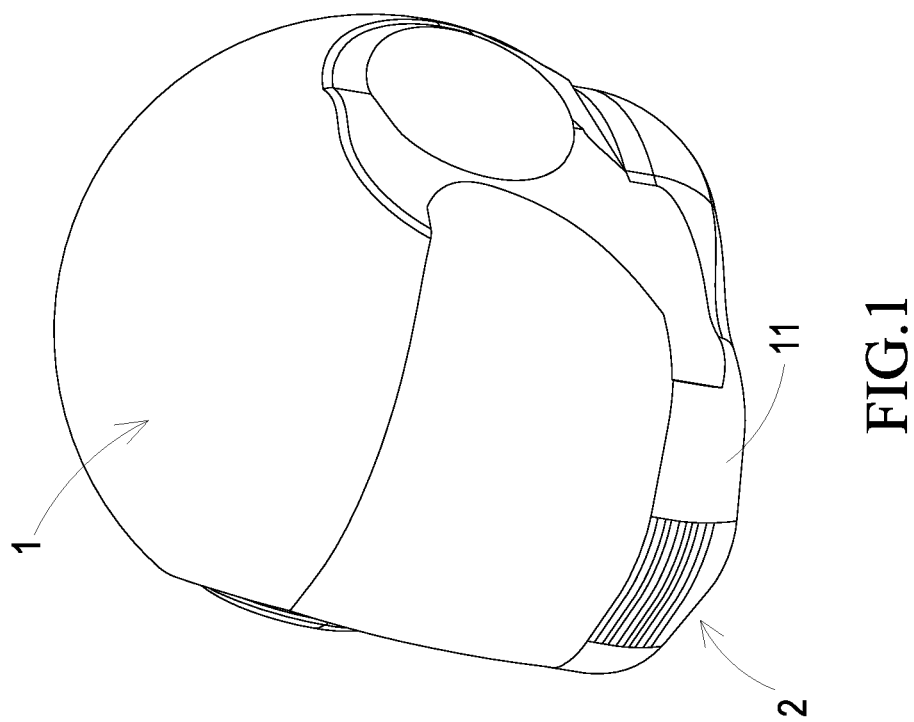
FIG. 1 illustrates a schematic perspective view of a helmet according to an exemplary embodiment of the present disclosure.
Figure 4:
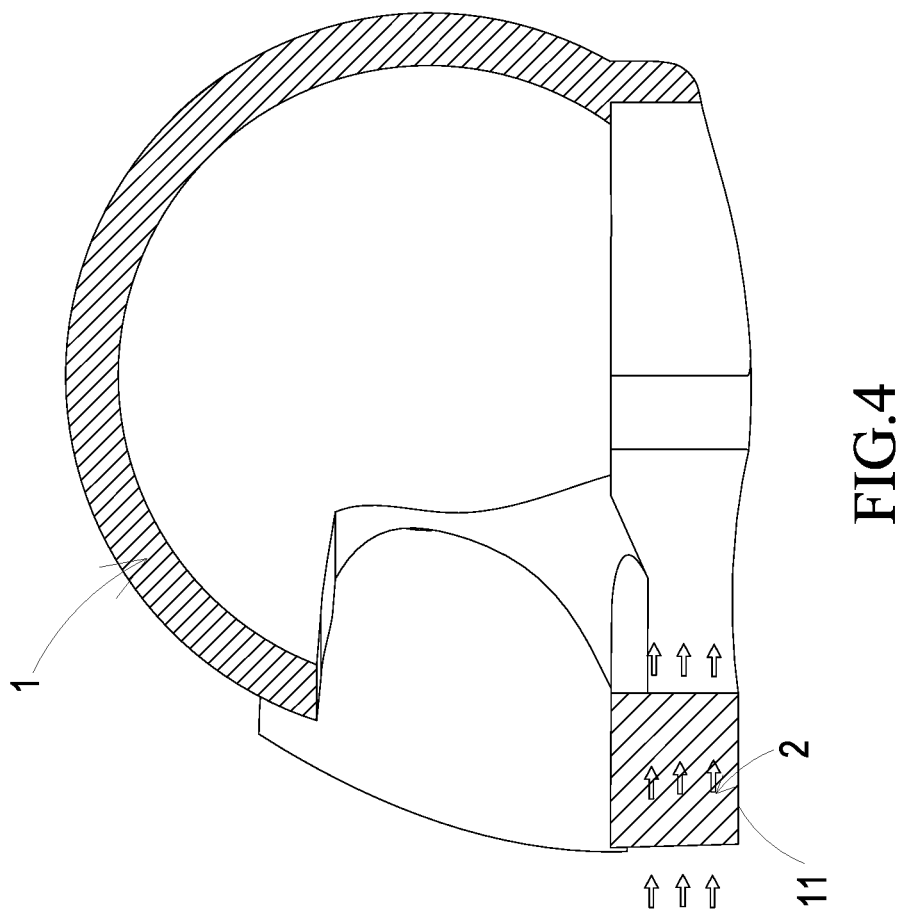
FIG. 4 illustrates a schematic cross-sectional view of the helmet showing the gas flow direction during a purification process according to the exemplary embodiment of the present disclosure.

Please refer to FIG. 1 and FIG. 4. The present disclosure provides a helmet mainly including a helmet body 1 and a gas detection and purification device 2. In this embodiment, the purification device 2 (as shown in FIG. 1) is disposed on the front edge portion 11 of the helmet body 1 for detecting, purifying gas, and guiding the gas into the nose portion and/or the mouth portion of the wearer.

Figure 2A:
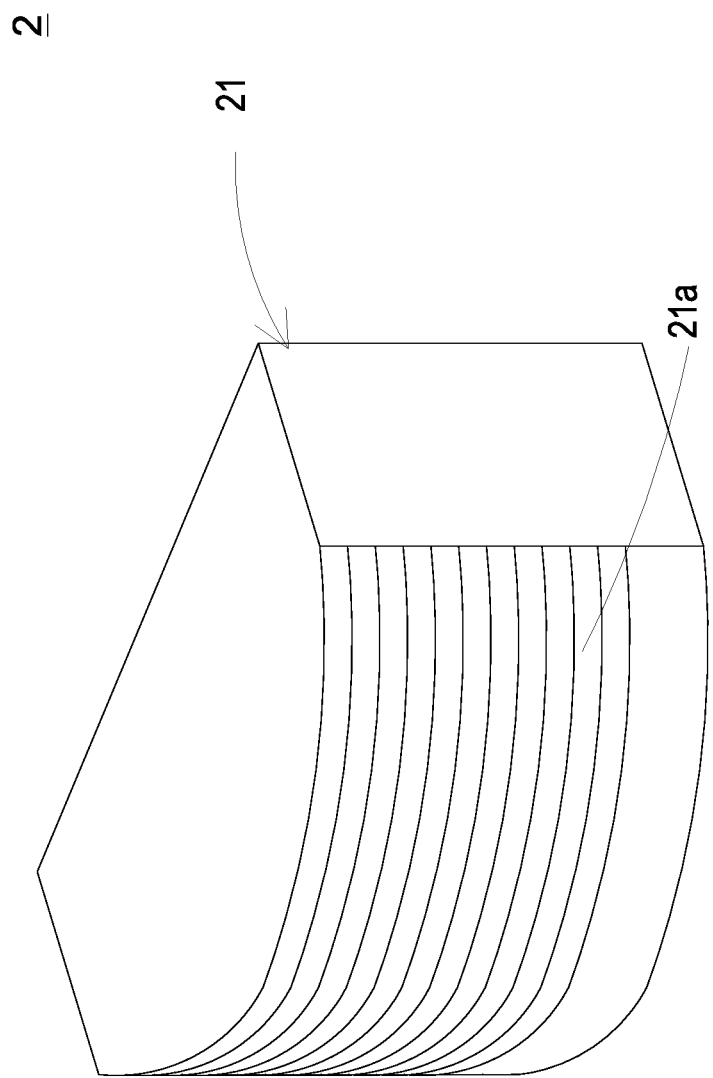
FIG. 2A illustrates a schematic perspective view of a gas detection and purification device of the helmet according to the exemplary embodiment of the present disclosure.
Figure 2B:
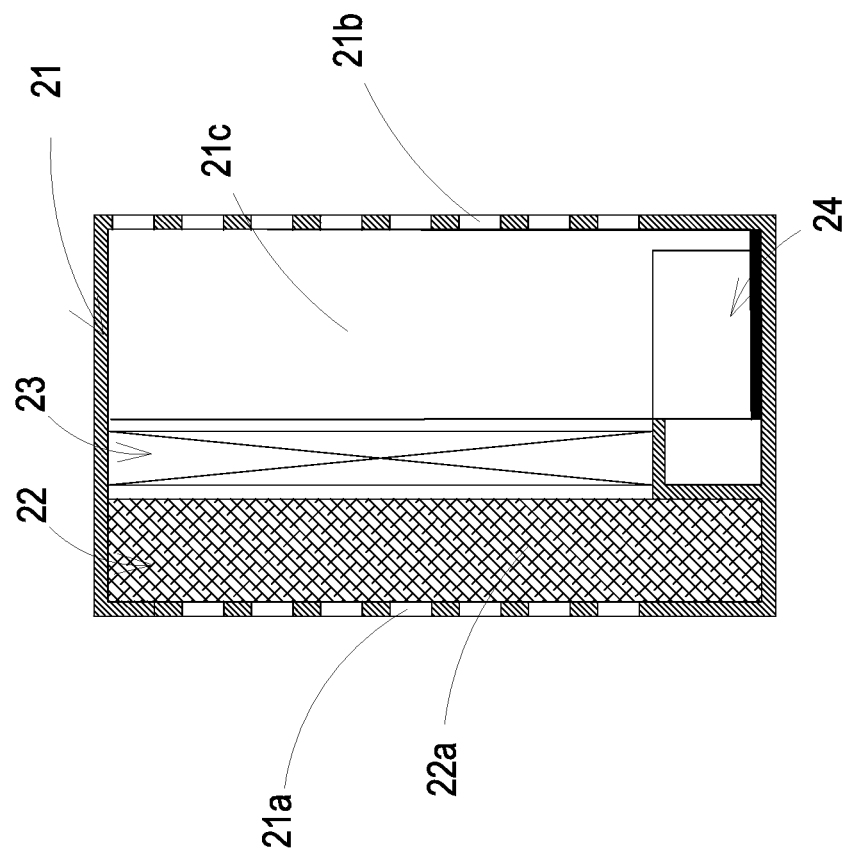
FIG. 2B illustrates a cross-sectional view from a side perspective of the gas detection and purification device of the helmet according to the exemplary embodiment of the present disclosure.
Figure 2C:
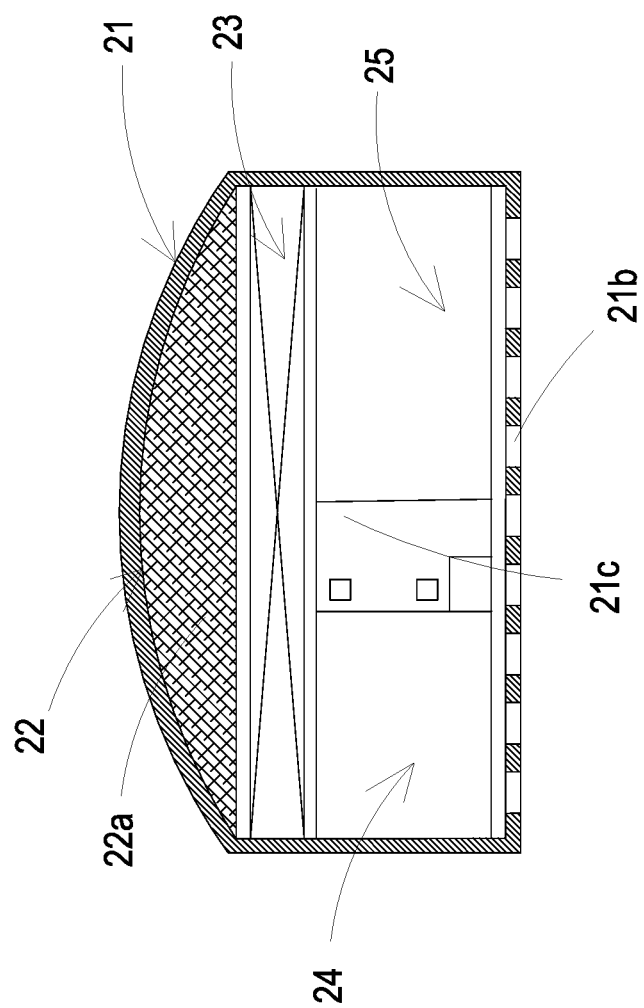
FIG. 2C illustrates a cross-sectional view from a top perspective of the gas detection and purification device of the helmet according to the exemplary embodiment of the present disclosure.

Please refer to FIG. 2A to FIG. 2C. In this embodiment, the gas detection and purification device 2 of the present disclosure includes a body 21, a purification module 22, a gas-guiding unit 23, a gas detection module 24, and a power module 25. The body 21 has at least one gas inlet 21a, at least one gas outlet 21b, and a gas channel 21c disposed in the body 21. The gas channel 21c is located between the gas inlet 21a and the gas outlet 21b. The purification module 22 is disposed in the gas channel 21c so as to filter a gas guided from the gas channel 21c. The gas-guiding unit 23 is disposed in the gas channel 21c at one side thereof adjacent to the purification module 22, so as to guide the gas into the purification module 22 from the gas inlet 21a for filtering and purifying, and discharge the purified gas out of the gas detection and purification device 2 through the gas outlet 21b. The gas detection module 24 is disposed in the body 21 for detecting the gas guided into the body 21 from the gas inlet 21a to obtain a gas detection data. The power module 25 is disposed in the body 21 and is electrically connected to the gas detection module 24 and the gas-guiding unit 23 so as to provide power for the gas detection module 24 and the gas-guiding unit 23. In such configuration, the gas detection module 24 detects and obtains a gas detection data for calculating, so as to allow the gas detection module 24 to control the gas-guiding unit 23 to start or stop operation based on the gas detection data. When the gas-guiding unit 23 is in operation, the gas-guiding unit 23 guides gas into the body 21 from the gas inlet 21a, passes through the purification module 22 for filtering and purifying, and discharges the purified gas out of the body 21 from the gas outlet 21b at last. Thus, when a wearer wears the helmet 1, the purified gas can be directly supplied to the nose portion and/or the mouth portion of the wearer for providing the wearer with the purified gas to breath.

Further, please refer to FIG. 2C, FIG. 3A to FIG. 3D. The purification module 22 disposed in the gas channel 21c may have various embodiments. For example, as shown in FIG. 2C, the purification module 22 may be a filtering unit 22a. When the gas is guided into the gas channel 21c by the gas-guiding unit 23, the chemical smog, bacteria, dusts, particles, and pollens in the gas are absorbed by the filtering unit 22a so as to achieve the effect of filtering and purifying the gas guided therethrough. The filtering unit 22a may be one of an electrostatic filter, an activated carbon filter, and a high-efficiency particulate air (HEPA) filter. Furthermore, in some embodiments, a cleansing element containing chlorine dioxide may be coated on the filtering unit 22a for suppressing viruses and bacteria in the gas. Accordingly, the suppression rate for influenza A virus, influenza B virus, Enterovirus, and Norovirus exceeds 99%, thereby allowing the reduction of the cross infections of the viruses. In some other embodiments, a herbal protection coating layer including the extracts of Rhus chinensis Mill (may be Rhus chinensis Mill from Japan) and/or the extracts of Ginkgo biloba may be coated on the filtering unit 22a to form a herbal protection anti-allergy filter which can efficiently perform anti-allergy function and destroy cell surface proteins of influenza viruses (e.g., influenza virus subtype H1N1) passing through the herbal protection anti-allergy filter. In some other embodiments, a layer of silver ions may be coated on the filtering unit 22a for suppressing viruses and bacteria in the gas.

Figure 3A:
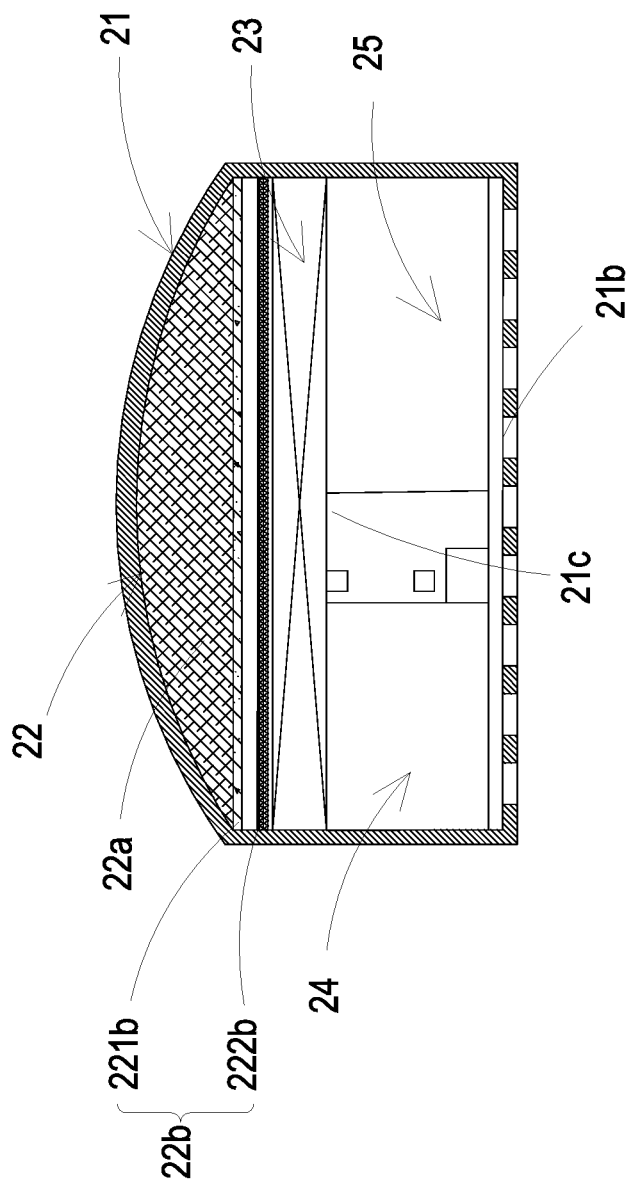
FIG. 3A illustrates a cross-sectional view of a purification module shown in FIG. 2C that the purification module includes the filter unit and a photocatalyst unit according to an exemplary embodiment of the present disclosure.

As shown in FIG. 3A, the purification module 22 may be a combination consisting of a filter unit 22a and a photocatalyst unit 22b. The photocatalyst unit 22b includes a photocatalyst 221b and an ultraviolet light 222b. The photocatalyst 221b and the ultraviolet light 222b are respectively disposed in the gas channel 21c by a spacing. The gas is guided into the gas channel 21c under the control of the gas-guiding unit 23, and the photocatalyst 221b is excited under illumination of the ultraviolet light 222b to convert the light energy into chemical energy, thereby degrading hazardous gases in the gas and/or sterilizing the gas. Accordingly, the gas guided into the gas detection and purification device 2 can be filtered and purified by the purification module 22.

Figure 3B:
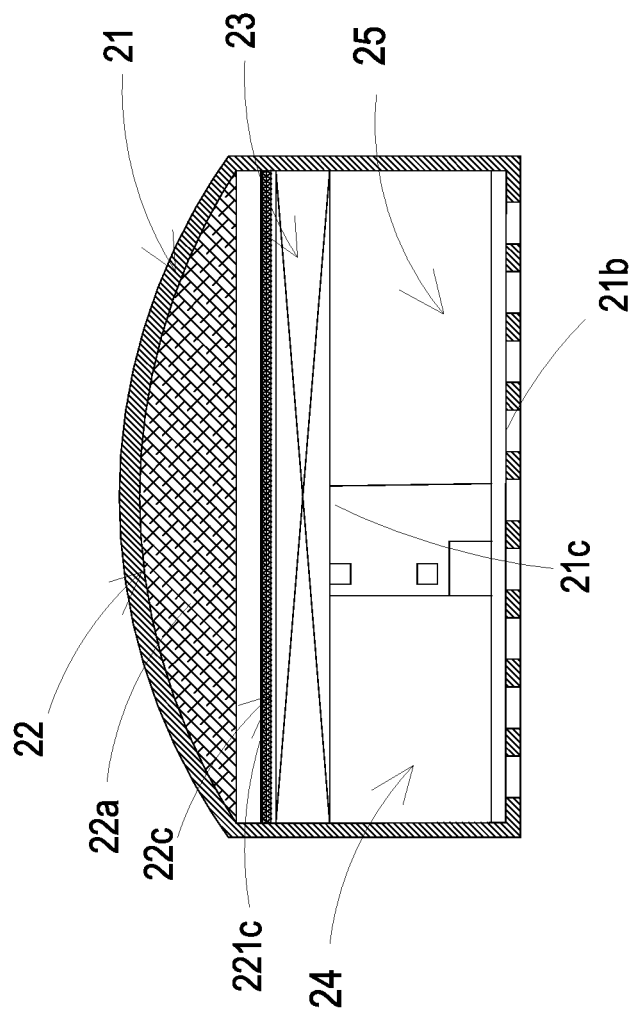
FIG. 3B illustrates a cross-sectional view of a purification module shown in FIG. 2C that the purification module includes the filter unit and a photo plasma unit according to an exemplary embodiment of the present disclosure.

As shown in FIG. 3B, the purification module 22 may be a combination consisting of a filter unit 22a and a photo plasma unit 22c. The photo plasma unit 22c includes a nanometer optical tube 221c, and the nanometer optical tube 221c is disposed in the gas channel 21c. When the gas is guided into the gas channel 21c under the control of the gas-guiding unit 23, the gas is illuminated by the light generated from the nanometer optical tube 221c so that the oxygen molecules and water molecules are degraded to form photo plasma with high oxidizing power, thereby forming a plasma stream capable of destroying organic molecules, so as to degrade volatile organic compounds such as formaldehyde and toluene in the gas into water and carbon dioxide. Thus, the gas guided into the gas detection and purification device 2 can be filtered and purified by the purification module 22.

Figure 3C:
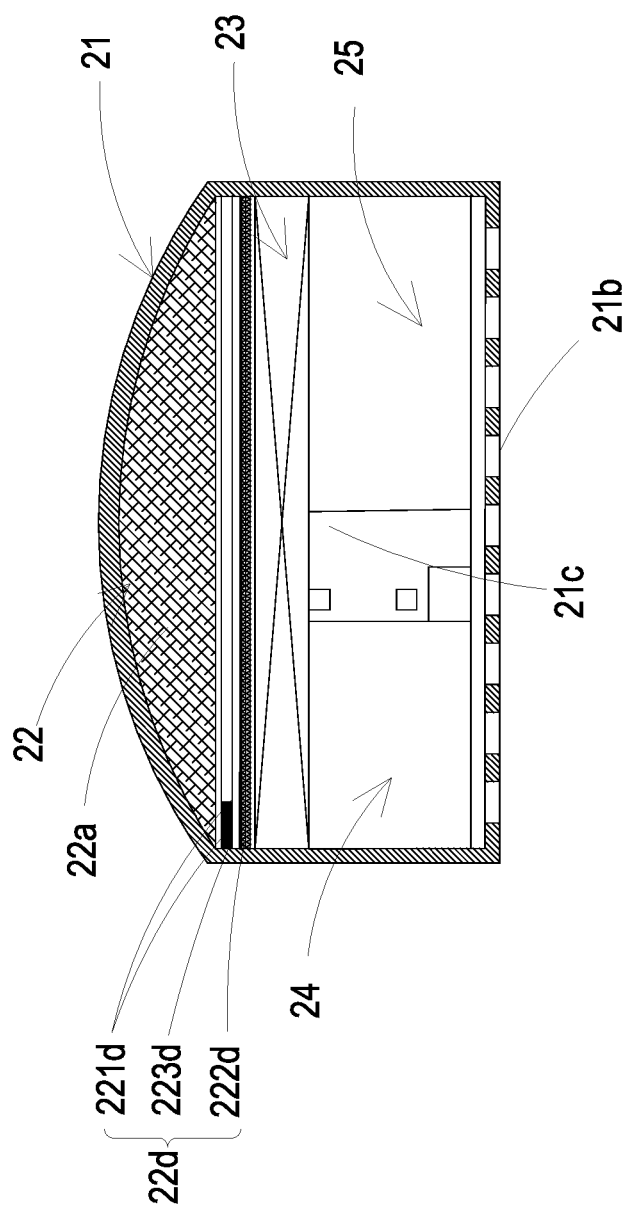
FIG. 3C illustrates a cross-sectional view of a purification module shown in FIG. 2C that the purification module includes the filter unit and a negative ion unit according to an exemplary embodiment of the present disclosure.

As shown in FIG. 3C, the purification module 22 may be a combination consisting of a filter unit 22a and a negative ion unit 22d. The negative ion unit 22d includes at least one electrode wire 221d, at least one dust-collecting plate 222d, and a boost power supply 223d. The electrode wire 221d and the dust-collecting plate 222d are disposed in the gas channel 21c. The boost power supply 223d provides the electrode wire 221d with high voltage electricity, and allows the dust-collecting plate 222d to carry negative ions thereon. Therefore, upon the gas is guided into the gas channel 21c under the control of the gas-guiding unit 23, the particulates in the gas with positive ions are adhered on the dust-collecting plate 222d with negative ions through the high voltage discharging of the electrode wire 221d. Accordingly, the gas guided into the gas detection and purification device can be filtered and purified by the purification module 22.

Figure 3D:
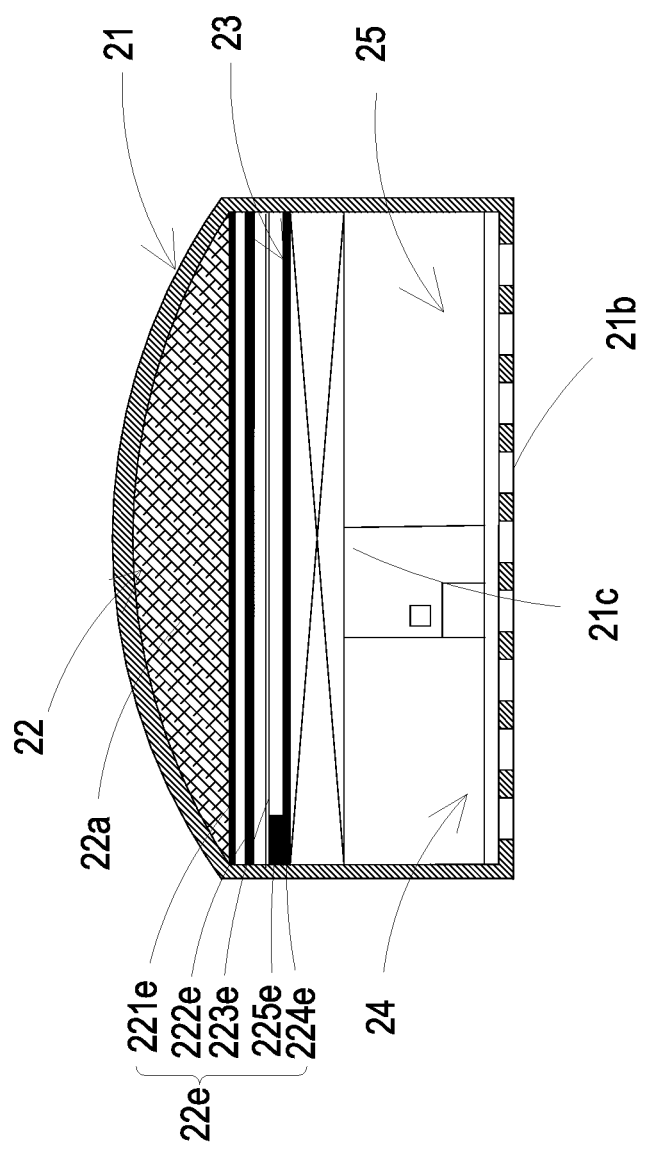
FIG. 3D illustrates a cross-sectional view of a purification module shown in FIG. 2C that the purification module includes the filter unit and a plasma ion unit according to an exemplary embodiment of the present disclosure.

As shown in FIG. 3D, the purification module 22 may be a combination consisting of a filter unit 22a and a plasma ion unit 22e. The plasma ion unit 22e includes an electric-field upper protection mesh 221e, an absorbing mesh 222e, a high-voltage discharge electrode 223e, an electric-field lower protection mesh 224e, and a boost power supply 225e. The electric-field upper protection mesh 221e, the absorbing mesh 222e, and the electric-field lower protection mesh 224e are disposed in the gas channel 21c, and the absorbing mesh 222e and the high-voltage discharge electrode 223e are clamped between the electric-field upper protection mesh 221e and the electric-field lower protection mesh 224e. The boost power supply 225e provides the high-voltage discharge electrode 223e with a high voltage so as to generate a high-voltage plasma column carrying plasma ions. Therefore, when the gas is guided into the gas channel 21c under the control of the gas-guiding unit 23, the oxygen molecules and the water molecules in the gas are ionized to form cations ($H^+$) and anions ($O_2^-$). After substances attached with water molecules around the ions attach on the surfaces of viruses and the surfaces of bacteria, the water molecules are converted into reactive oxygen species (ROS) with high oxidizing power (hydroxyl ions, $OH^-$ ions), which take away the hydrogen ions of the proteins on the surfaces of the viruses and the bacteria and degrade the viruses and the bacteria (through the oxidative decomposition reaction). Accordingly, the gas guided into the gas detection and purification device can be filtered and purified by the purification module 22.

In the present disclosure, the gas-guiding unit 23 may be a fan, for example, may be a vortex fan, a centrifugal fan, or the like. Alternatively, as shown in FIG. 5A, FIG. 5B, FIG. 6A, and FIG. 6B, the gas-guiding unit 23 may be an actuation pump 23a. The actuation pump 23a may be sequentially stacked with an inlet plate 231, a resonance sheet 232, a piezoelectric actuator 233, a first insulation sheet 234, a conductive sheet 235, and a second insulation sheet 236. The inlet plate 231 has at least one inlet hole 231a, at least one convergence channel 231b, and a convergence chamber 231c. The inlet hole 231a is used to guide the gas outside the actuation pump 23a to flow therein. The inlet hole 231a correspondingly penetrates to the convergence channel 231b, and the convergence channel 231b is converged at the convergence chamber 231c, so that the gas guided from the inlet hole 231a can be converged into the convergence chamber 231c. In this embodiment, the number of the inlet holes 231a and the number of the convergence channels 231b are the same. Moreover, in this embodiment, the number of the inlet holes 231a and the number of the convergence channels 231b both are four, respectively, but not limited thereto. The four inlet holes 231a respectively penetrate to the four convergence channels 231b, and the four convergence channels 231b are converged into the convergence chamber 231c.

Figure 5A:
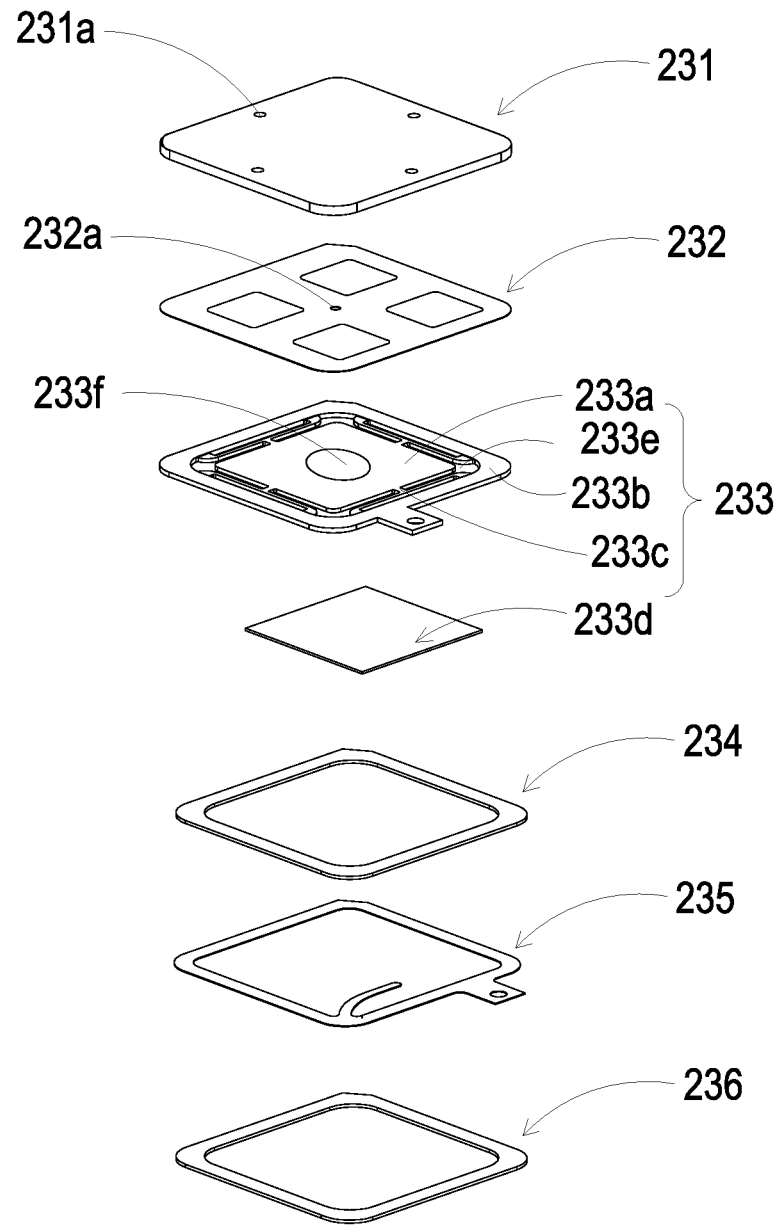
FIG. 5A illustrates a front exploded view of an actuation pump of the helmet according to the exemplary embodiment of the present disclosure.
Figure 5B:
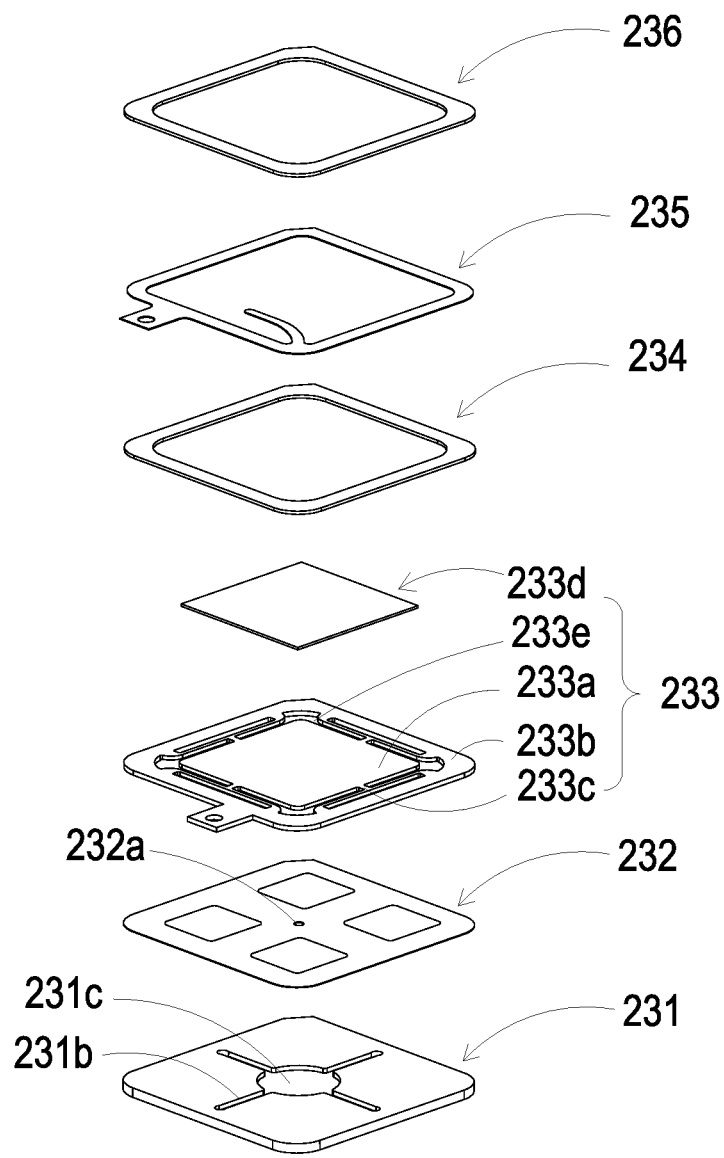
FIG. 5B illustrates a rear exploded view of the actuation pump of the helmet according to the exemplary embodiment of the present disclosure.
Figure 6A:
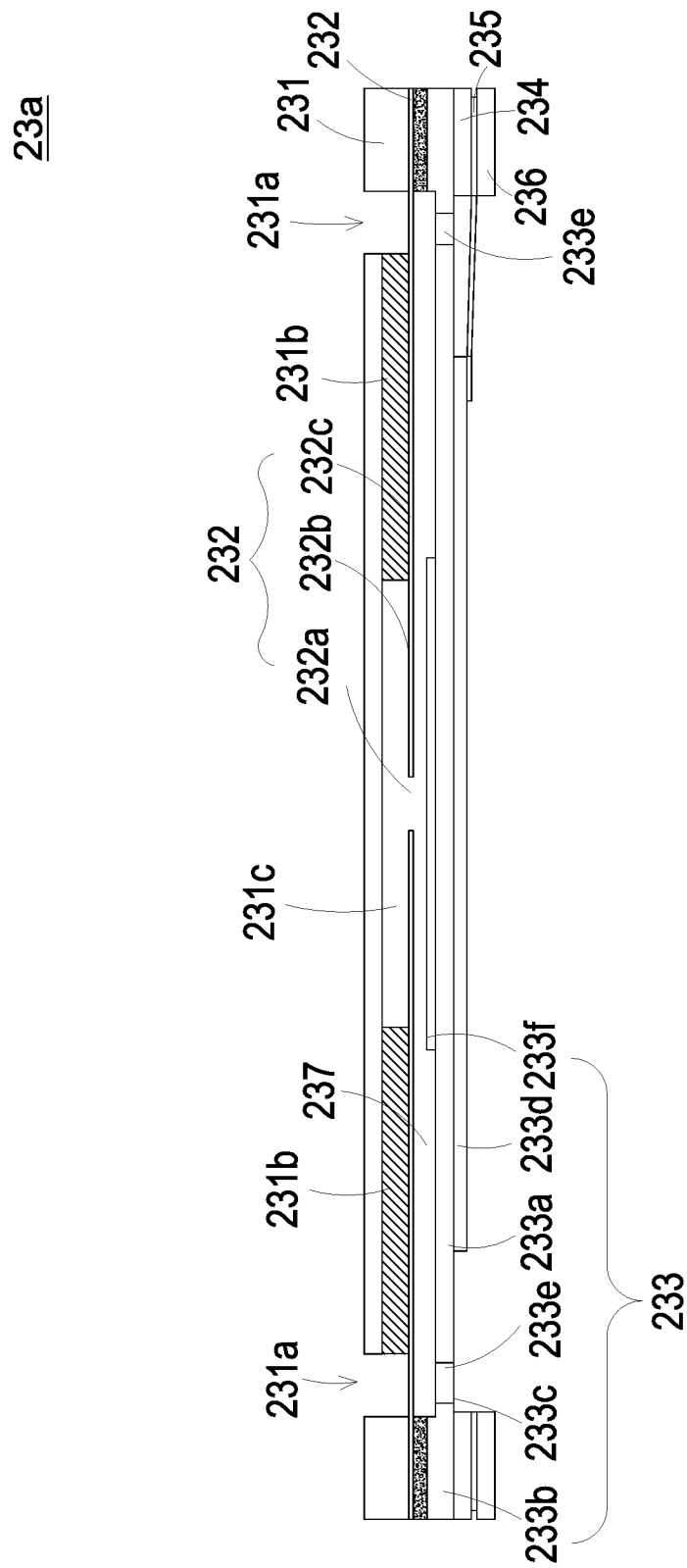
FIG. 6A illustrates a cross-sectional view of the actuation pump of the helmet according to the exemplary embodiment of the instant disclosure.

Please refer to FIG. 5A, FIG. 5B, and FIG. 6A. The resonance sheet 232 may be assembled on the inlet plate 231 by attaching. Furthermore, the resonance sheet 232 has a perforation 232a, a movable portion 232b, and a fixed portion 232c. The perforation 232a is located at a center portion of the resonance sheet 232 and corresponds to the convergence chamber 231c of the inlet plate 231. The movable portion 232b is disposed at a periphery of the perforation 232a and is disposed at a portion corresponding to the convergence chamber 231c. The fixed portion 232c is disposed at an outer periphery of the resonance sheet 232 and attached to the inlet plate 231.

Please still refer to FIG. 5A, FIG. 5B, and FIG. 6A. The piezoelectric actuator 233 includes a suspension plate 233a, an outer frame 233b, at least one supporting element 233c, a piezoelectric element 233d, at least one gap 233e, and a protruding portion 233f. In the embodiments of the present disclosure, the suspension plate 233a is in square shape. It is understood that, the reason why the suspension plate 233a adopts the square shape is that, comparing with a circle suspension plate having a diameter equal to the side length of the square suspension plate 233a, the square suspension plate 233a has an advantage of saving electricity. The power consumption of a capacitive load operated at a resonance frequency may increase as the resonance frequency increases, and since the resonance frequency of a square suspension plate 233a is much lower than that of a circular suspension plate, the power consumption of the square suspension plate 233a is relatively low as well. Consequently, the square design of the suspension plate 233a used in one or some embodiments of the present disclosure has the benefit of power saving. In the embodiments of the present disclosure, the outer frame 233b is disposed around the periphery of the suspension plate 233a. The at least one supporting element 233c is connected between the suspension plate 233a and the outer frame 233b to provide a flexible support for the suspension plate 233a. In the embodiments of the present disclosure, the piezoelectric element 233d has a side length, which is shorter than or equal to a side length of the suspension plate 233a. The piezoelectric element 233d is attached to a surface of the suspension plate 233a so as to drive the suspension plate 233a to bend and vibrate when the piezoelectric element 233d is applied with a voltage. There is at least one gap 233e formed between the suspension plate 233a, the outer frame 233b, and the at least one supporting element 233c, and the at least one gap 233e is provided for the gas to flow therethrough. The protruding portion 233f is disposed on a surface of the suspension plate 233a opposite to the surface of the suspension plate 233a where the piezoelectric element 233d is attached. In this embodiment, the protruding portion 233f may be a convex structure protruding out from and integrally formed with the surface of the suspension plate 233a opposite to the surface of the suspension plate 233a where the piezoelectric element 233d is attached by performing an etching process on the suspension plate 233a.

Please still refer to FIG. 5A, FIG. 5B, and FIG. 6A. In this embodiment, the inlet plate 231, the resonance sheet 232, the piezoelectric actuator 233, the first insulation sheet 234, the conductive sheet 235, and the second insulation sheet 236 are sequentially stacked and assembled, and a chamber space 237 is required to be formed between the suspension plate 233a and the resonance sheet 232. The chamber space 237 can be formed by filling a material, such as conductive adhesive, between the resonance sheet 232 and the outer frame 233b of the piezoelectric actuator 233, but not limited thereto. By filling a material between the resonance sheet 232 and the suspension plate 233a, a certain distance can be maintained between the resonance sheet 232 and the suspension plate 233a to form the chamber space 237, so as to allow the gas to be guided and flowed more quickly. Further, since an appropriate distance is maintained between the suspension plate 233a and the resonance sheet 232, the interference raised by the contact between the suspension plate 233a and the resonance sheet 232 can be reduced, so that the noise generation can be reduced as well. In other embodiments, the required thickness of the conductive adhesive between the resonance sheet 232 and the outer frame 233b of the piezoelectric actuator 233 can be decreased by increasing the height of the outer frame 233b of the piezoelectric actuator 233. Accordingly, the entire structure of the actuation pump 23a would not be indirectly affected by the hot pressing temperature and the cooling temperature owing to the filling material of conductive adhesive, thereby avoiding the situation that the actual spacing of the chamber space 237 is affected by the thermal expansion and contraction of the filling material of the conductive adhesive, but embodiments are not limited thereto. Moreover, the height of the chamber space 237 also affects the transmission efficiency of the actuation pump 23a. Therefore, it is important to maintain a fixed height of the chamber space 237 for the purpose of achieving stable transmission efficiency of the actuation pump 23a.

Figure 6B:
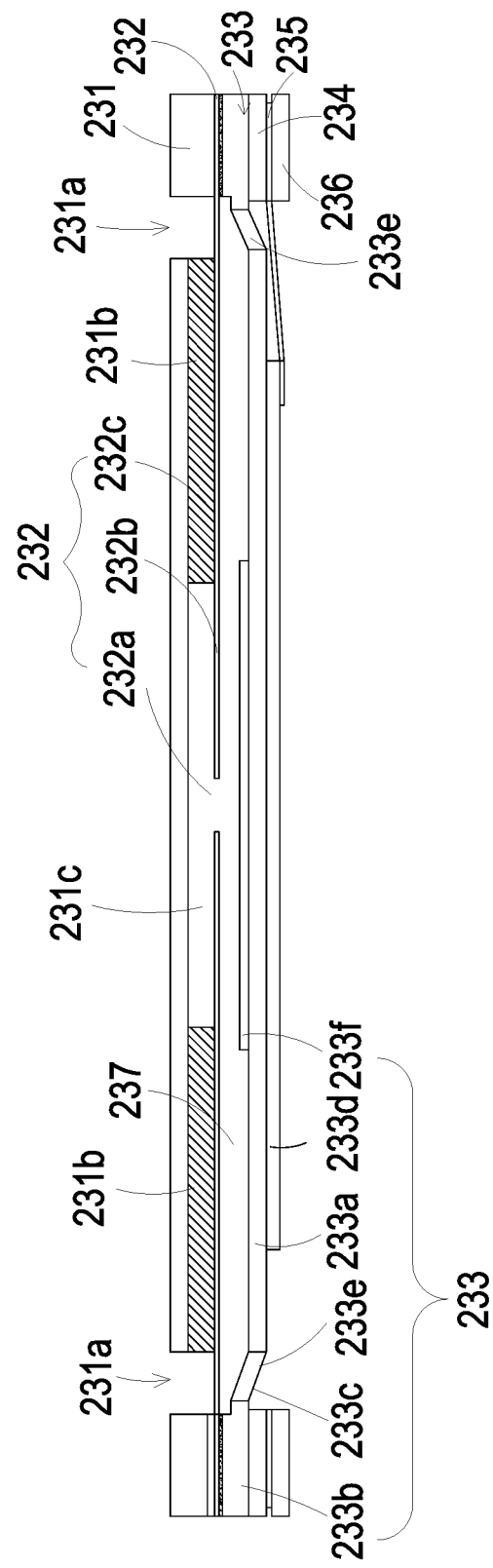
FIG. 6B illustrates a cross-sectional view of the actuation pump of the helmet according to another exemplary embodiment of the present disclosure.

Therefore, as shown in FIG. 6B, in other embodiments of the piezoelectric actuator 233, the suspension plate 233a can be extended out with a certain distance by stamping. The extension distance can be adjusted by at least one supporting element 233c between the suspension plate 233a and the outer frame 233b so as to make the surface of the protruding portion 233f on the suspension plate 233a to be not coplanar with the surface of the outer frame 233b. The piezoelectric actuator 233 is assembled to the resonance sheet 232 by attaching the piezoelectric actuator 233 onto the fixed portion 232c of the resonance sheet 232 through hot pressing with applying a few amount of filling material (such as the conductive adhesive) on the assembly surface of the outer frame 233b. In this embodiment, through the structure improvement of the chamber space 237 obtained by stamping the suspension plate 233a of the piezoelectric actuator 233, the required chamber space 237 can be obtained by directly adjusting the extension distance of the suspension plate 233a of the piezoelectric actuator 233. This could effectively simplify the structural design of the chamber space 237, and also simplify the manufacturing process and shortens the manufacturing time of the chamber space 237. Moreover, the first insulation sheet 234, the conductive sheet 235, and the second insulation sheet 236 are all thin sheets with a frame like structure, and the first insulation sheet 234, the conductive sheet 235, and the second insulation sheet 236 are sequentially stacked and assembled on the piezoelectric actuator 233 to form the main structure of the actuation pump 23a.

Figure 6C:
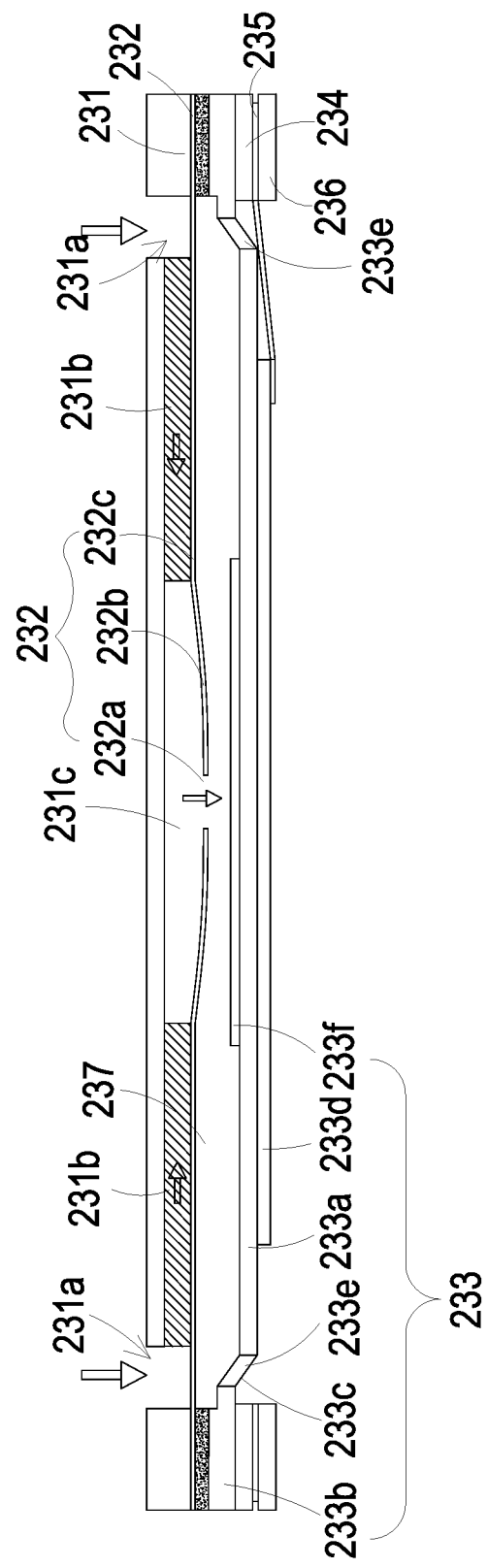
FIG. 6C to FIG. 6E illustrate cross-sectional views showing the actuation pump of the helmet at different operation steps.
Figure 6D:
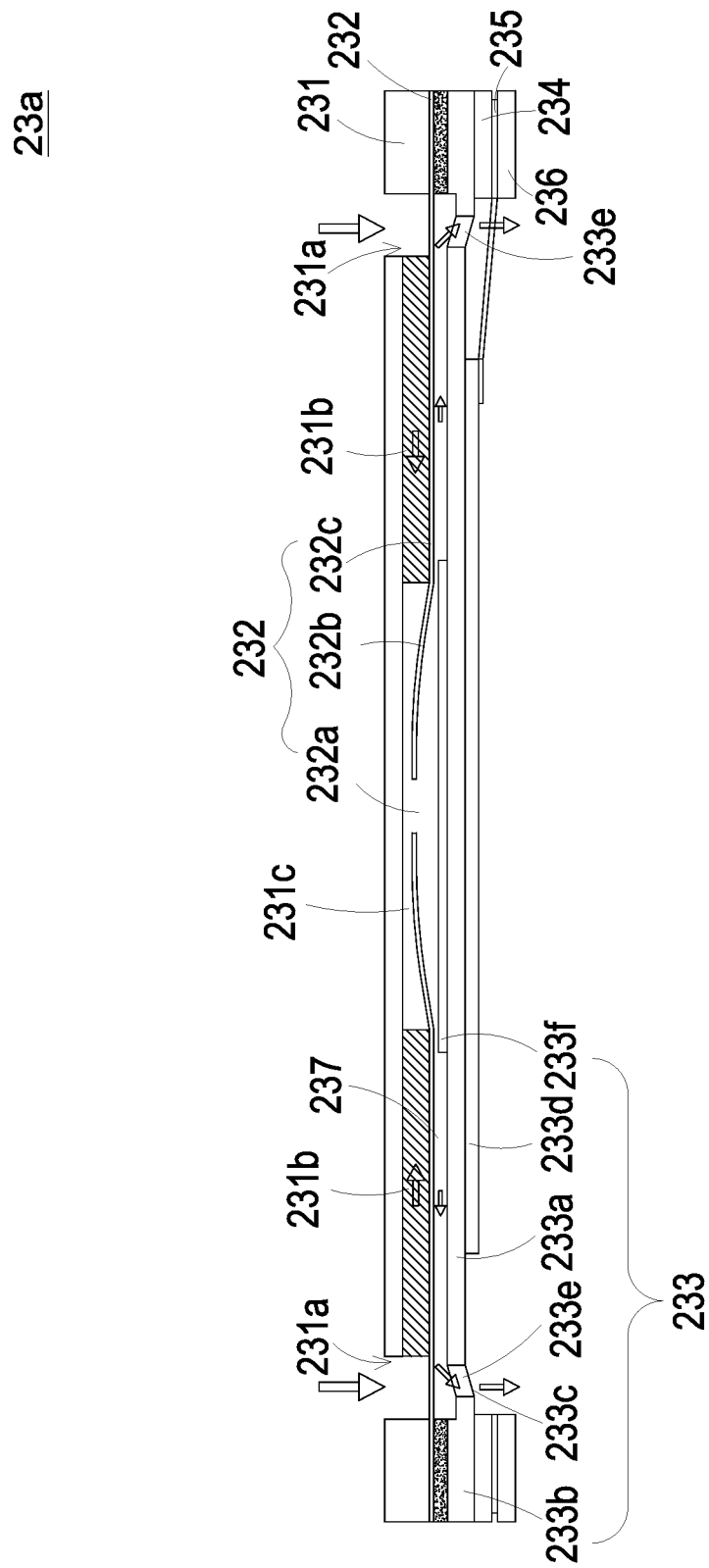
Figure 6E:
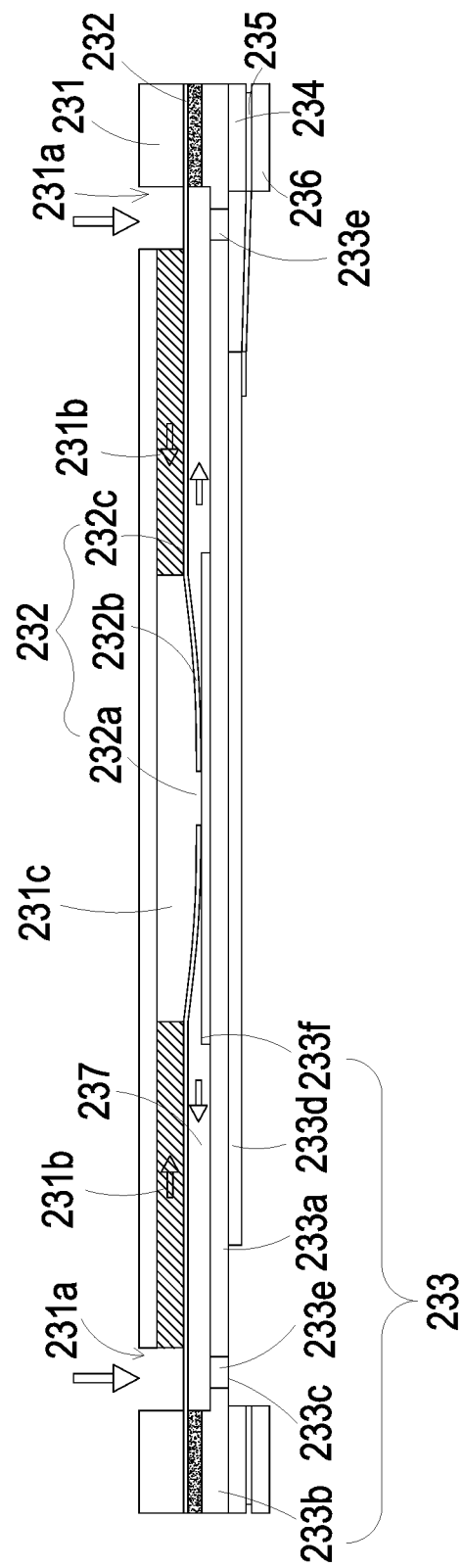
Figure 7:
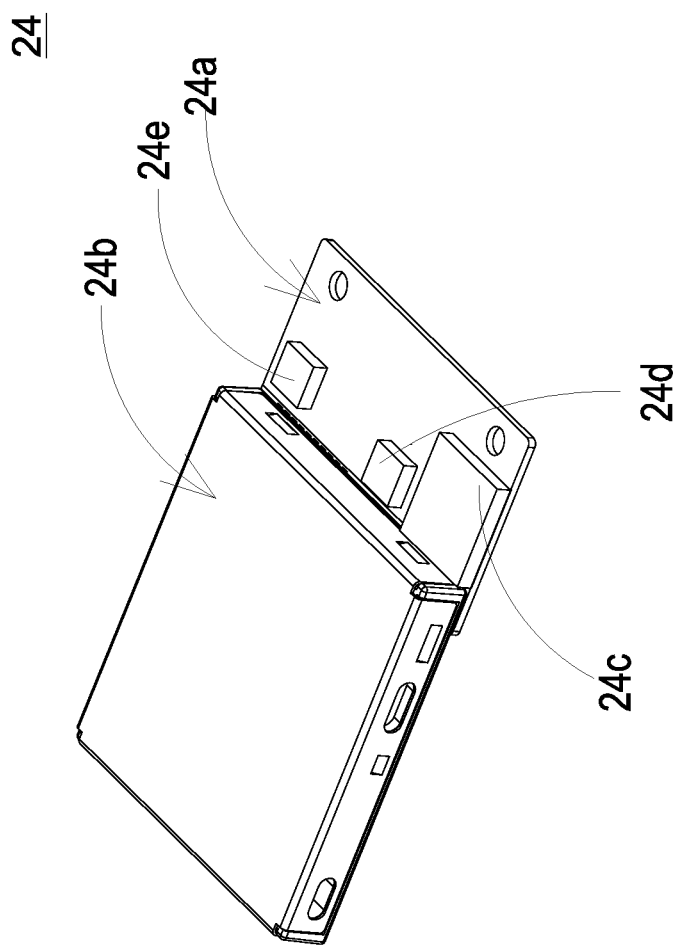
FIG. 7 illustrates a schematic perspective view of a gas detection module according to the exemplary embodiment of the present disclosure.

In order to understand the operation steps of the aforementioned actuation pump 23a in transmitting gas, please refer to FIG. 6C to FIG. 6E. Please refer to FIG. 6C first, the piezoelectric element 233d of the piezoelectric actuator 233 deforms after being applied with a driving voltage, and the piezoelectric element 233d drives the suspension plate 233a to move downwardly and to move away from the inlet plate 231. Thus, the volume of the chamber space 237 is increased and a negative pressure is generated inside the chamber space 237, thereby drawing the gas in the convergence chamber 231c into the chamber space 237. At the same time, owing to the resonance effect, the resonance sheet 232 moves downwardly and moves away from the inlet plate 231 correspondingly, which also increases the volume of the convergence chamber 231c. Furthermore, since the gas inside the convergence chamber 231c is drawn into the chamber space 237, the convergence chamber 231c is in a negative pressure state as well, and the gas can be drawn into the convergence chamber 231c through the inlet hole 231a and the convergence channel 231b. Then, please refer to FIG. 6D. The piezoelectric element 233d drives the suspension plate 233a to move upwardly to move toward the inlet plate 231, and compresses the chamber space 237. Similarly, since the resonance sheet 232 resonates with the suspension plate 233a, the resonance sheet 232 also moves upwardly and moves toward the inlet plate 231, thereby pushing the gas in the chamber space 237 to be transmitted out of the actuation pump 23a through the at least one gap 233e so as to achieve gas transmission. Last, please refer to FIG. 6E. When the suspension plate 233a moves resiliently to its original position, the resonance sheet 232 still moves downwardly and moves away from the inlet plate 231 due to its inertia momentum. At this time, the resonance sheet 232 compresses the chamber space 237, so that the gas in the chamber space 237 is moved toward the gap 233e and the volume of the convergence chamber 231c is increased. Accordingly, the gas can be drawn into the convergence chamber 231c continuously through the inlet holes 231a and the convergence channels 231b and can be converged at the convergence chamber 231c. By continuously repeating the operation steps of the actuation pump 23a shown in FIG. 6C to FIG. 6E, the actuation pump 23a can make the gas continuously enter into the flow paths formed by the inlet plate 231 and the resonance sheet 232 from the inlet holes 231a, thereby generating a pressure gradient. The gas is then transmitted outward through the gap 233e. As a result, the gas can flow at a relatively high speed, thereby achieving the effect of gas transmission of the actuation pump 23a.

Furthermore, as shown in FIG. 2B, FIG. 2C, FIG. 7, and FIG. 16, the gas detection module 24 is disposed in the body 21 for detecting the gas in the helmet body 1 to obtain a gas detection data. The gas detection module 24 includes a control circuit board 24a, a gas detection main body 24b, a microprocessor 24c, a communication device 24d, and a power unit 24e. The gas detection main body 24b, the microprocessor 24c, the communication device 24d, and the power unit 24e are packaged with the control circuit board 24a, so that the gas detection main body, the microprocessor, the communication device, and the power unit are integrated with and electrically connected to the control circuit board 24a. The power unit 24e is used to provide the gas detection main body 24b with power for operation, such that the gas detection main body 24b is able to detect the guided gas inside the body 21 so as to obtain the gas detection data. The power unit 24e may obtain the power by electrically connecting to a power module 25. The microprocessor 24c receives and calculates the gas detection data, so as to allow the microprocessor 24c to control the gas-guiding unit 23 to start or stop the operation of gas purification. The communication device 24d receives the gas detection data from the microprocessor 24c and transmits the gas detection data to an external device 3, by which the external device 3 can obtain information and a notification alert based on the gas detection data. The external device 3 may be a mobile device or a cloud processing device.

Figure 14A:
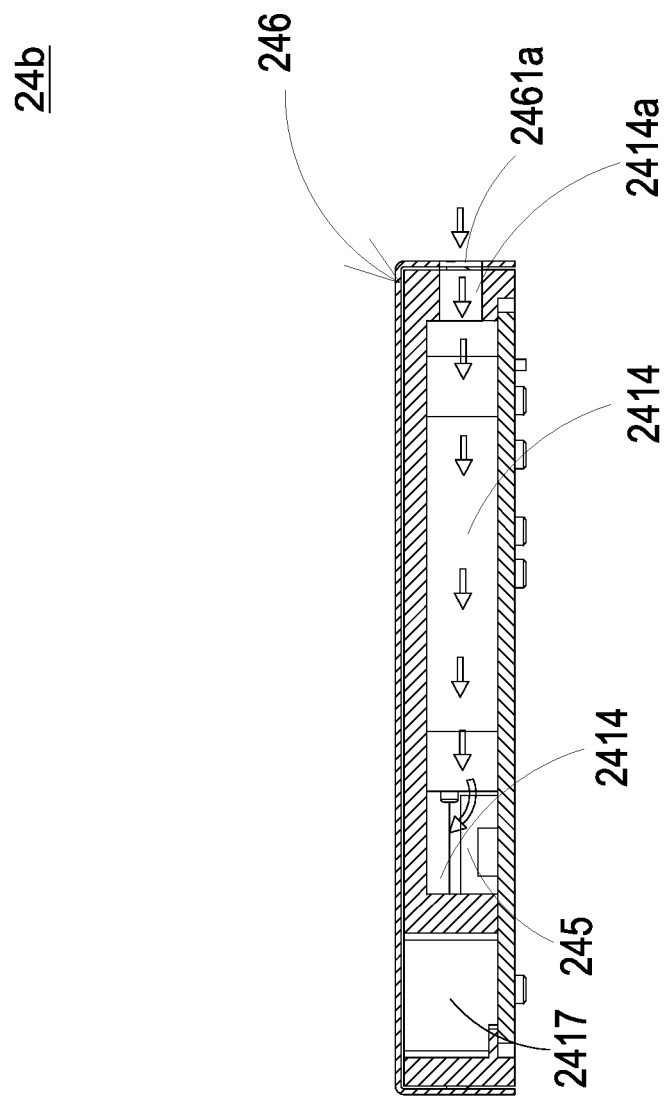
FIG. 14A to FIG. 14C illustrate schematic cross-sectional views showing the gas paths of the gas detection main body of the gas detection module according to the exemplary embodiment of the present disclosure.
Figure 14B:
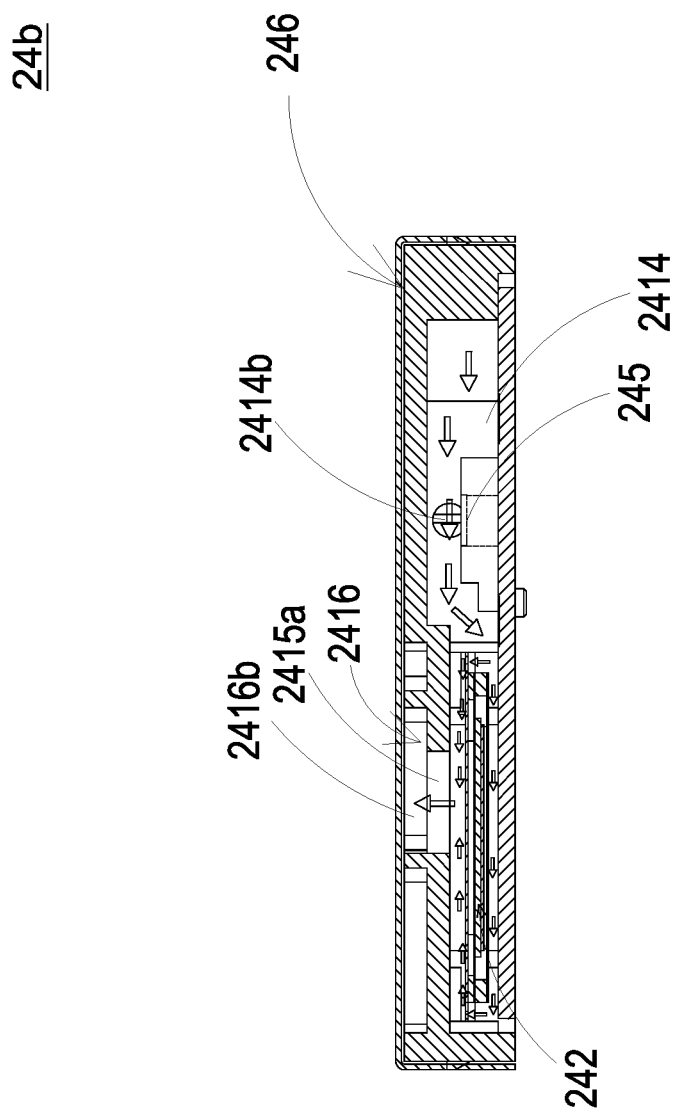

Further, as shown in FIG. 7, FIG. 8A to 8C, FIG. 9A and FIG. 9B, FIG. 10, and FIG. 11A and FIG. 11B, the gas detection main body 24b includes a base 241, a piezoelectric actuation element 242, a driving circuit board 243, a laser component 244, a particulate sensor 245, and an outer cap 246. The base 241 has a first surface 2411, a second surface 2412, a laser configuration region 2413, a gas inlet groove 2414, a gas-guiding component loading region 2415, and a gas outlet groove 2416. The first surface 2411 and the second surface 2412 are opposite surfaces. The laser configuration region 2413 is hollowed out from the first surface 2411 to the second surface 2412. The gas inlet groove 2414 is recessed from the second surface 2412 and located adjacent to the laser configuration region 2413. The outer cap 246 covers the base 241 and has a side plate 2461. The side plate 2461 has a gas inlet opening 2461a and a gas outlet opening 2461b. The gas inlet groove 2414 has a gas inlet through hole 2414a, and the gas inlet through hole 2414a is in communication with outside environment of the base 241 and corresponds to the gas inlet opening 2461a of the outer cap 246. A light permissive window 2414b is penetrated on the two lateral walls of the gas inlet groove 2414 and is in communication with the laser configuration region 2413. Therefore, the first surface 2411 of the base 241 is covered by the outer cap 246, and the second surface 2412 of the base 241 is covered by the driving circuit board 243, so that the gas inlet groove 2414 and the driving circuit board 243 together define a gas inlet path (as shown in FIG. 10A and FIG. 14A).

Figure 9A:
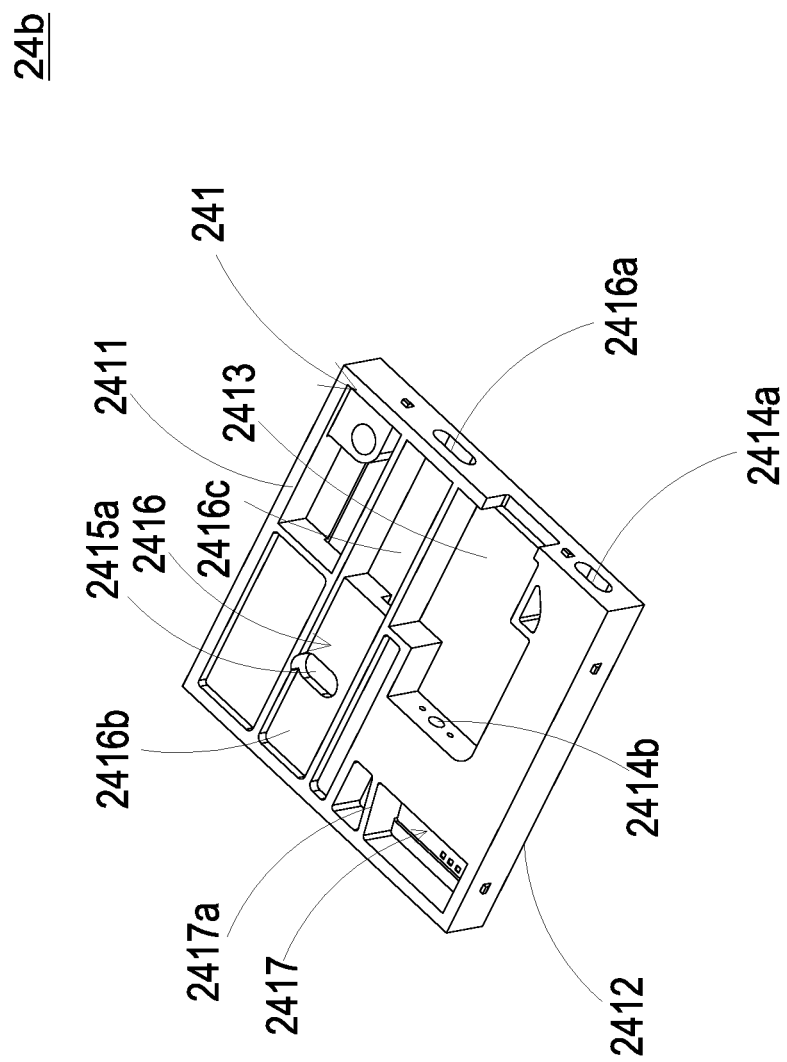
FIG. 9A illustrates a schematic perspective view of the base of the gas detection main body of the gas detection module according to the exemplary embodiment of the present disclosure.
Figure 9B:
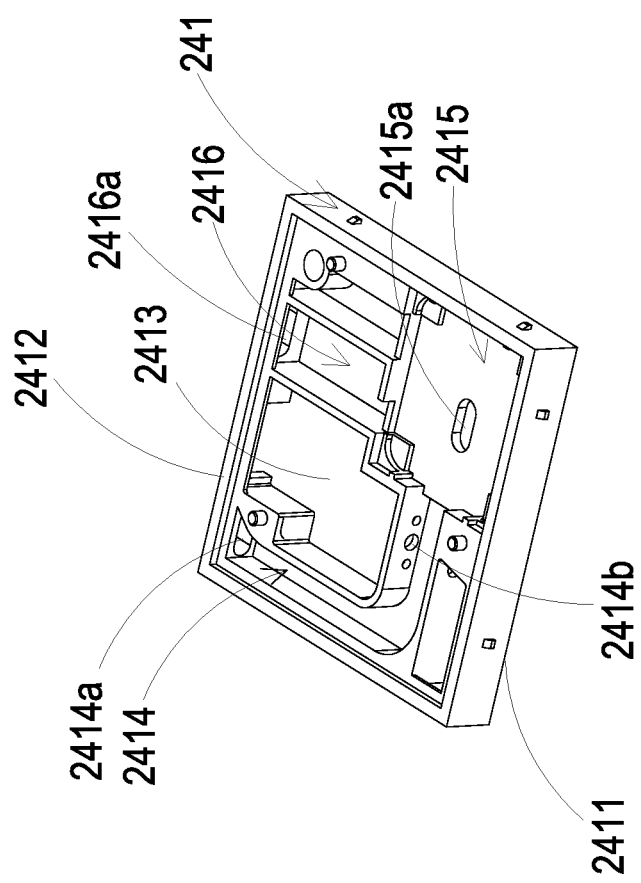
FIG. 9B illustrates a schematic perspective view of the base of the gas detection main body of the gas detection module according to the exemplary embodiment of the present disclosure, from another perspective.

Furthermore, as shown in FIG. 9A and FIG. 9B, the gas-guiding component loading region 2415 is recessed from the second surface 2412 and in communication with the gas inlet groove 2414. A gas flowing hole 2415a penetrates the bottom of the gas-guiding component loading region 2415. The gas outlet groove 2416 has a gas outlet through hole 2416a, and the gas outlet through hole 2416a corresponds to the gas outlet opening 2461b of the outer cap 246. The gas outlet groove 2416 includes a first region 2416b and a second region 2416c. The first region 2416b is recessed from a portion of the first surface 2411 corresponding to a vertical projection region of the gas-guiding component loading region 2415. The second region 2416c is hollowed out from the first surface 2411 to the second surface 2412 in a region where the first surface 2411 at a portion extended from a portion not corresponding to the vertical projection region of the gas-guiding component loading region 2415. The first region 2416b is connected to the second region 2416c and forms a stepped structure. Moreover, the first region 2416b of the gas outlet groove 2416 is in communication with the gas flowing hole 2415a of the gas-guiding component loading region 2415, and the second region 2416c of the gas outlet groove 2416 is in communication with the gas outlet through hole 2416a. Therefore, when the first surface 2411 of the base 241 is covered by the outer cap 246 and the second surface 2412 of the base 241 is covered by the driving circuit board 243, the gas outlet groove 2416, the base 241, and the driving circuit board 243 together define a gas outlet path (as shown in FIG. 10 to FIG. 14C).

Figure 8A:
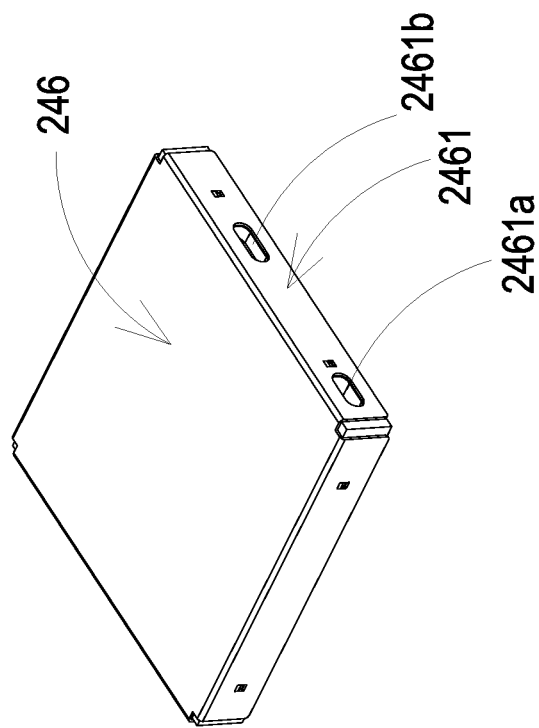
FIG. 8A illustrates a schematic perspective view of a gas detection main body of the gas detection module according to the exemplary embodiment of the present disclosure.
Figure 8B:
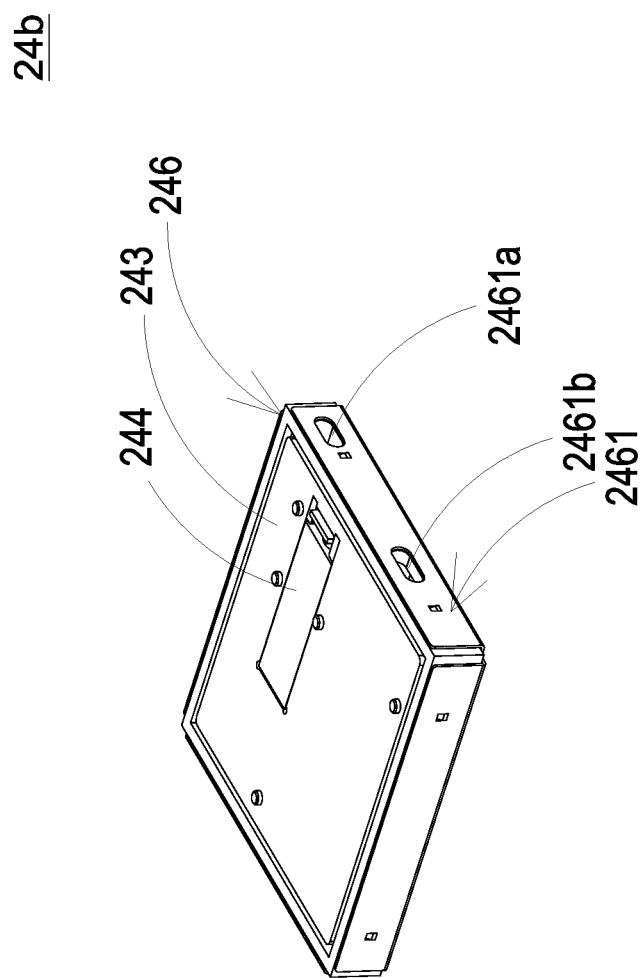
FIG. 8B illustrates a schematic perspective view of the gas detection main body of the gas detection module according to the exemplary embodiment of the present disclosure, from another perspective.
Figure 8C:
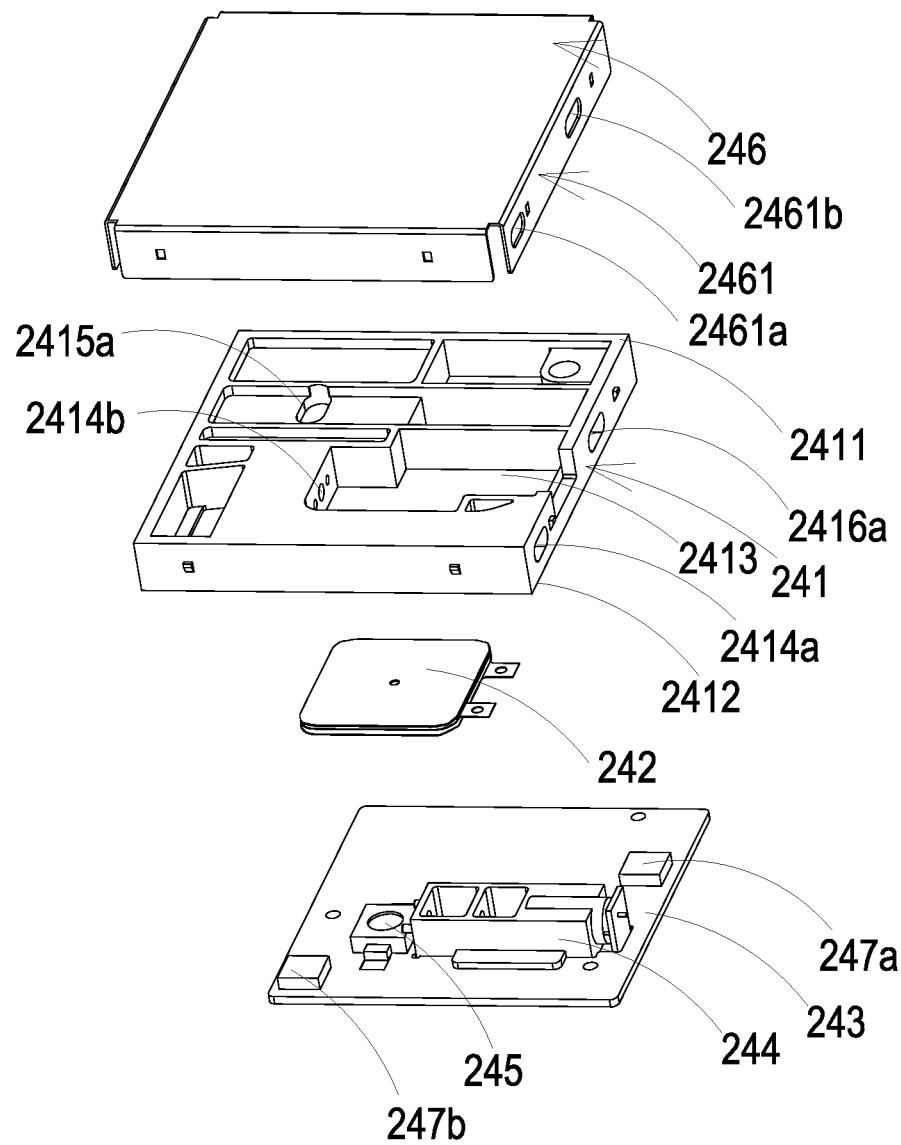
FIG. 8C illustrates an exploded view of the gas detection main body of the gas detection module according to the exemplary embodiment of the present disclosure.
Figure 10:
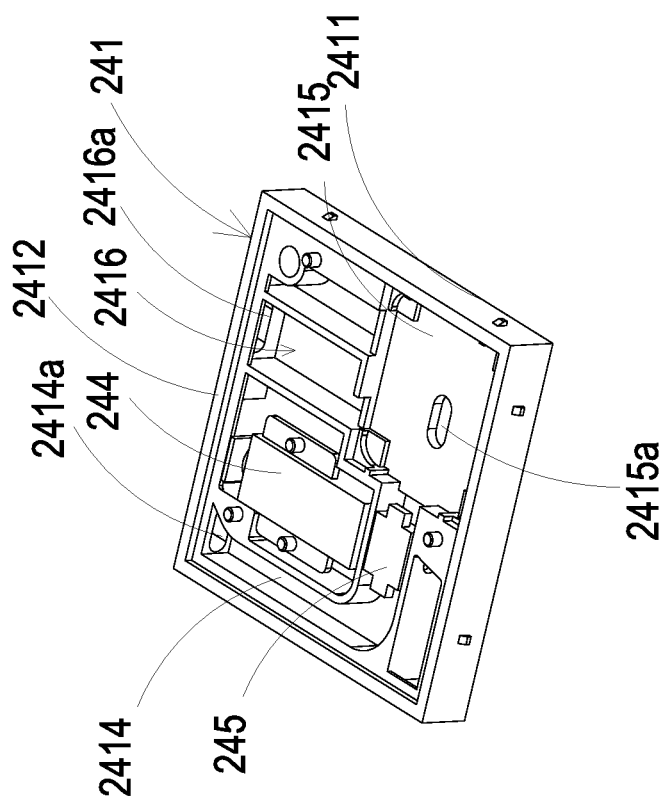
FIG. 10 illustrates a schematic perspective view showing that the laser component and the particulate sensor are received in the base of the gas detection main body of the gas detection module according to the exemplary embodiment of the present disclosure.

Furthermore, as shown in FIG. 8C and FIG. 10, the laser component 244 and the particulate sensor 245 are disposed on the driving circuit board 243 and located in the base 241. Here, in order to clearly explain the positions of the laser component 244, the particulate sensor 245, and the base 241, the driving circuit board 243 is not illustrated in FIG. 10. Please refer to FIG. 8C, FIG. 9B, and FIG. 10. The laser component 244 is received in the laser configuration region 2413 of the base 241. The particulate sensor 245 is received in the gas inlet groove 2414 of the base 241 and aligned with the laser component 244. Moreover, the laser component 244 corresponds to the light permissive window 2414b. The light permissive window 2414b allows the light beam emitted by the laser component 244 to pass therethrough, so that the light beam may further enter into the gas inlet groove 2414. The path of the light beam emitted by the laser component 244 passes through the light permissive window 2414b and is orthogonal to the gas inlet groove 2414. The light beam emitted by the laser component 244 enters into the gas inlet groove 2414 through the light permissive window 2414b, and illuminates the suspended particulate in the gas in the gas inlet groove 2414. When the light beam encounters the suspended particulate, the light beam will be scattered to generate light spots. Hence, the particulate sensor 245 receives and calculates the light spots generated by the scattering, such that the particulate sensor 245 obtains the particle size and the concentration of the suspended particulate in the gas and other related information. The suspended particulate may include viruses and bacteria. The particulate sensor 245 may be a PM2.5 sensor.

Figure 11A:
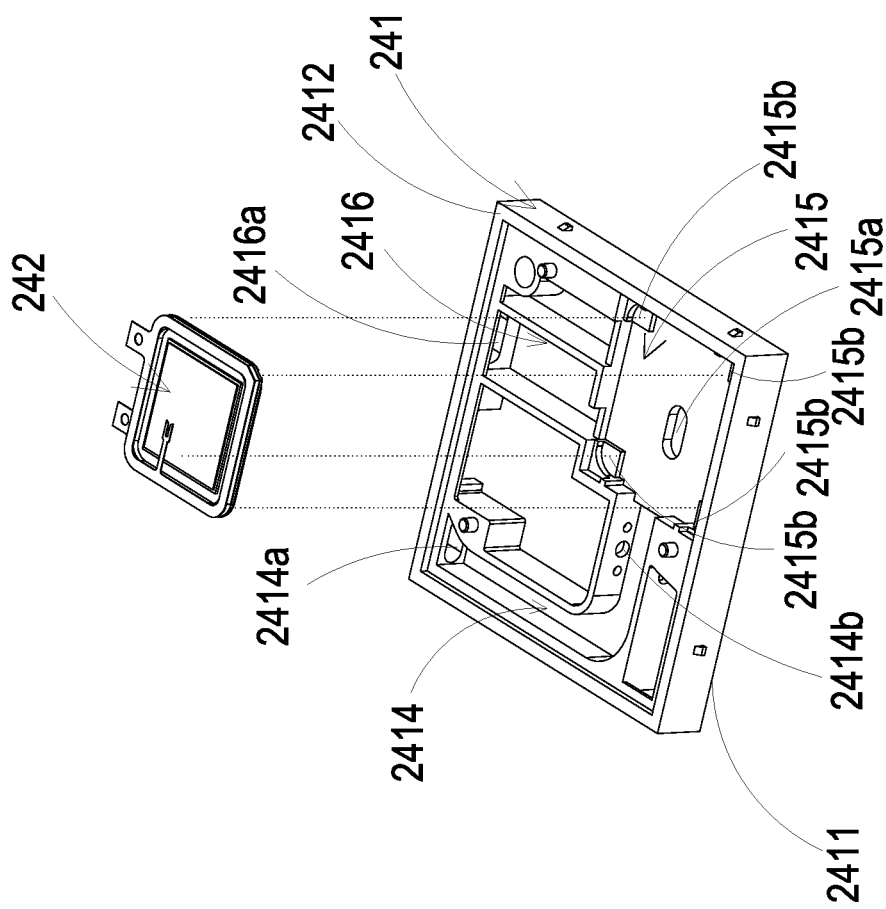
FIG. 11A illustrates an exploded view showing that the piezoelectric actuation member is to be assembled with the base in the gas detection main body of the gas detection module according to the exemplary embodiment of the present disclosure.
Figure 11B:
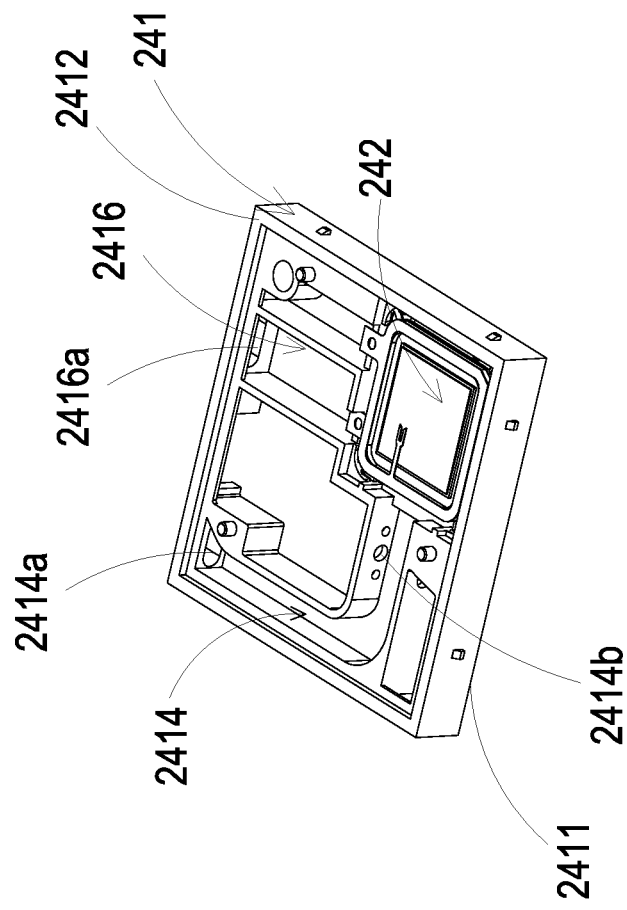
FIG. 11B illustrates a schematic perspective view showing that the piezoelectric actuation member is assembled with the base in the gas detection main body of the gas detection module according to the exemplary embodiment of the present disclosure.

Furthermore, as shown in FIG. 11A and FIG. 11B, the piezoelectric actuation element 242 is received in the gas-guiding component loading region 2415 of the base 241. The gas-guiding component loading region 2415 is in a square shape, and each of four corners of the gas-guiding component loading region 2415 has a positioning bump 2415b. The piezoelectric actuation element 242 is disposed in and positioned at the gas-guiding component loading region 2415 through the four positioning bumps 2415b. Furthermore, as shown in FIG. 9A, FIG. 9B, FIG. 14B, and FIG. 14C, the gas-guiding component loading region 2415 is in communication with the gas inlet groove 2414. When the piezoelectric actuation element 242 operates, the gas in the gas inlet groove 2414 is drawn into the piezoelectric actuation element 242, passed through the gas flowing hole 2415a of the gas-guiding component loading region 2415, and entered into the gas outlet groove 2416.

Figure 14C:
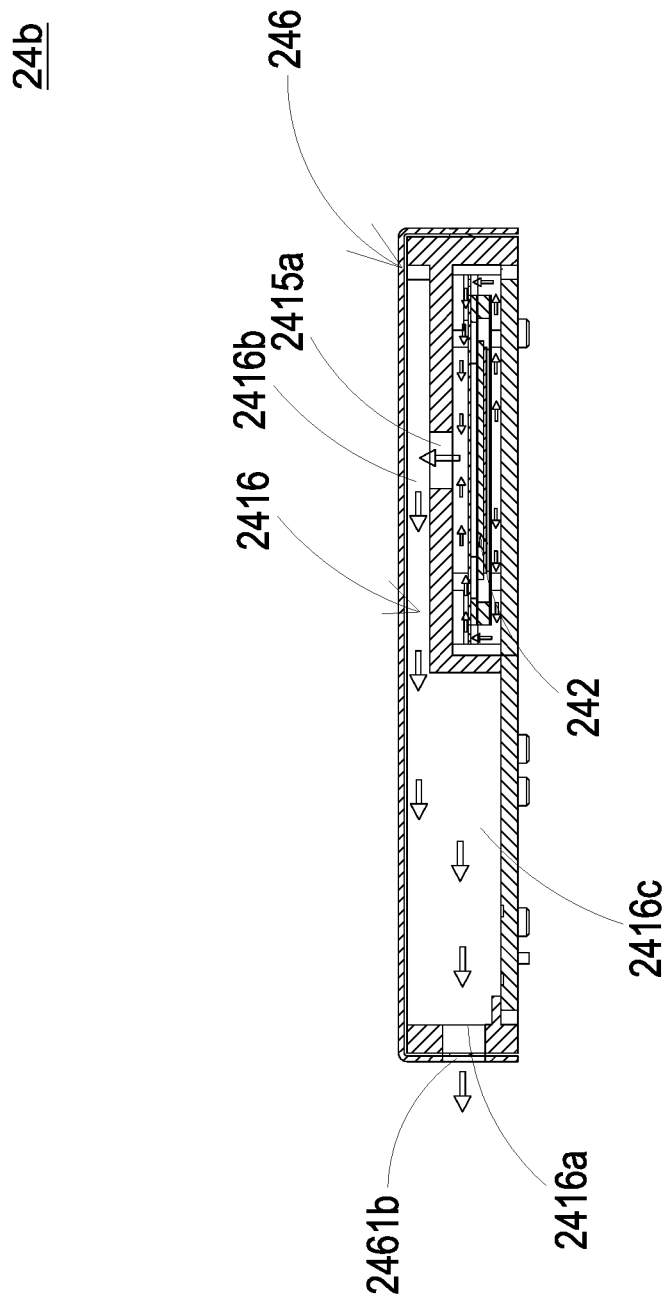

Furthermore, as shown in FIG. 8B and FIG. 8C, the driving circuit board 243 covers the second surface 2412 of the base 241. The laser component 244 is disposed on the driving circuit board 243 and electrically connected to the driving circuit board 243. The particulate sensor 245 is also disposed on the driving circuit board 243 and electrically connected to the driving circuit board 243. Moreover, as shown in FIG. 8A, when the outer cap 246 covers the base 241, the gas inlet opening 2461a is corresponding to the gas inlet through hole 2414a of the base 241 (as shown in FIG. 14A), and the gas outlet opening 2461b is corresponding to the gas outlet through hole 2416a of the base 241 (as shown in FIG. 14C).

Figure 12A:
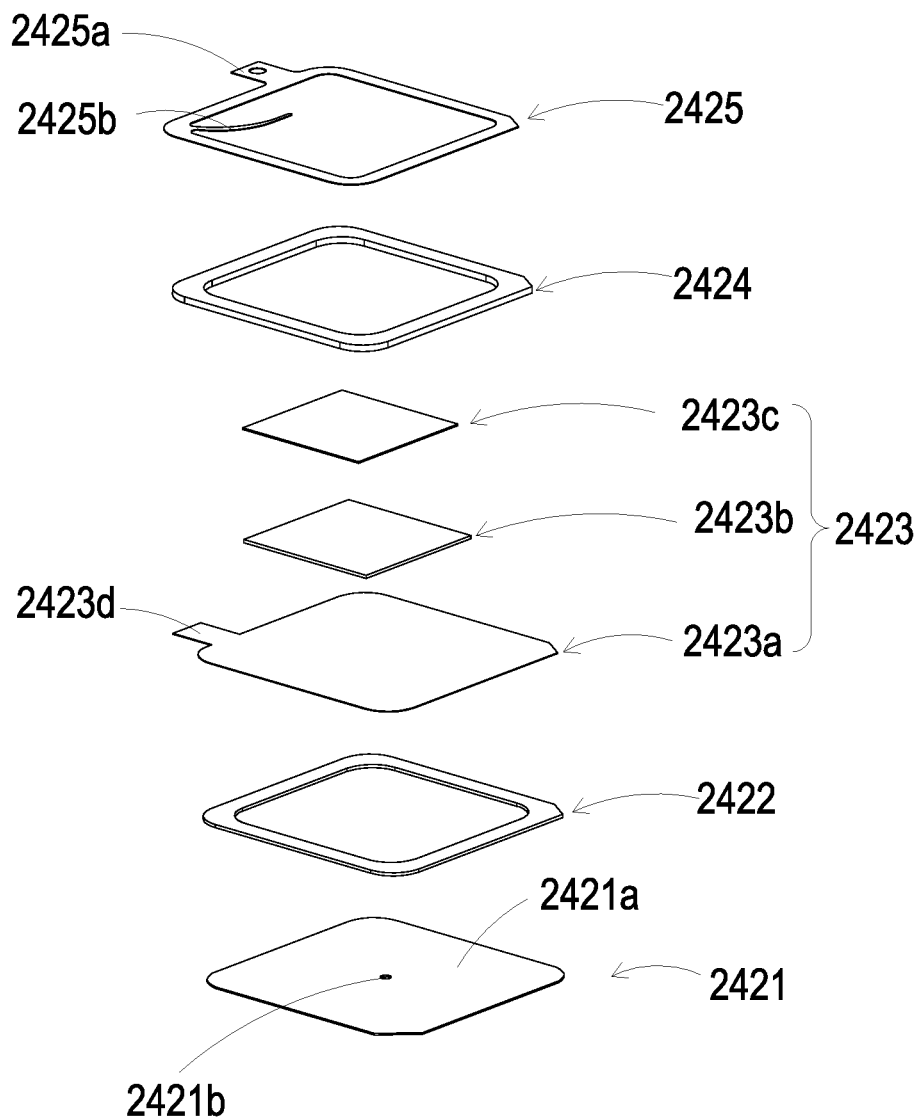
FIG. 12A illustrates an exploded view of the piezoelectric actuation member of the gas detection main body of the gas detection module according to the exemplary embodiment of the present disclosure.
Figure 12B:
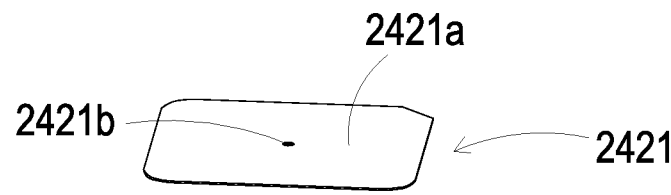
FIG. 12B illustrates an exploded view of the piezoelectric actuation member of the gas detection main body of the gas detection module according to the exemplary embodiment of the present disclosure, from another perspective.
Figure 12B:
Figure 12B:
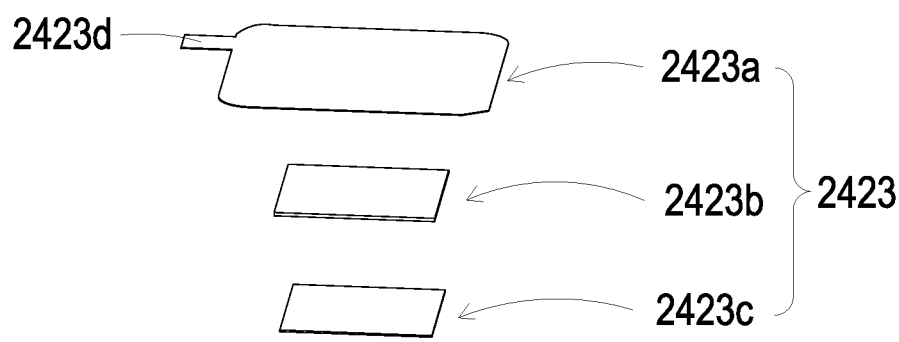
Figure 12B:
Figure 12B:
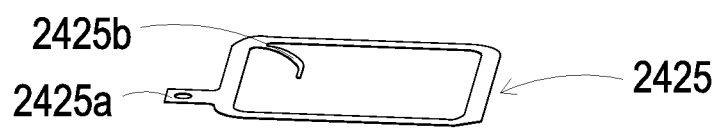

Please refer to FIG. 12A and FIG. 12B. The piezoelectric actuation element 242 includes a nozzle plate 2421, a chamber frame 2422, an actuation body 2423, an insulation frame 2424, and a conductive frame 2425. The nozzle plate 2421 is made of a flexible material, and the nozzle plate 2421 has a suspension sheet 2421a and a hollow hole 2421b. The suspension sheet 2421a is a flexible sheet, which can bend and vibrate. The shape and the size of the suspension sheet 2421a approximately correspond to those of the inner edge of the gas-guiding component loading region 2415, but the embodiments are not limited thereto. The shape of the suspension sheet 2421a may be one of square, circle, ellipse, triangle, and polygon. The hollow hole 2421b penetrates the center portion of the suspension sheet 2421a for allowing the gas flowing therethrough.

Figure 13A:
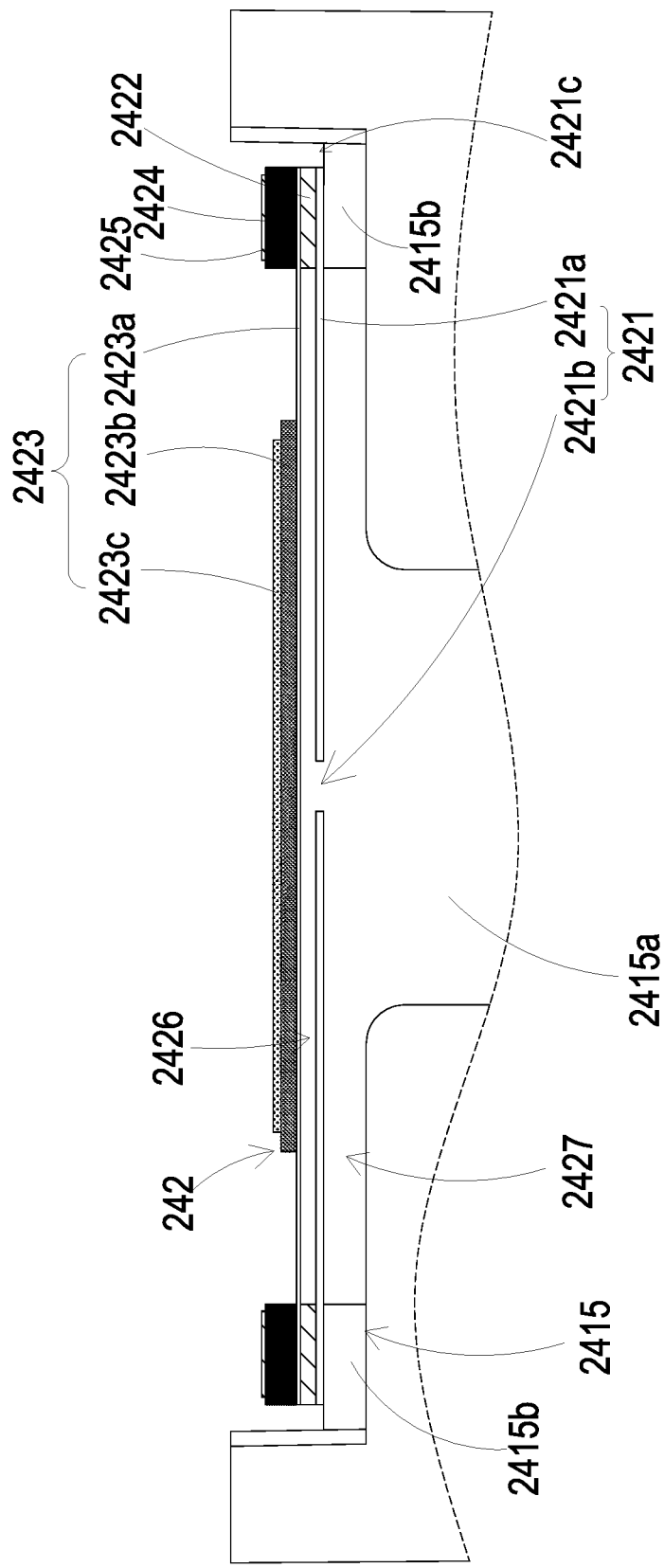
FIG. 13A illustrates a schematic cross-sectional view showing that the piezoelectric actuation member of the gas detection main body of the gas detection module is assembled with the gas-guiding component loading region according to the exemplary embodiment of the present disclosure.

Further, as shown in FIG. 12A, FIG. 12B, and FIG. 13A, the chamber frame 2422 is stacked on the nozzle plate 2421, and the shape of the chamber frame 2422 is corresponding to the shape of the nozzle plate 2421. The actuation body 2423 is stacked on the chamber frame 2422, and a resonance chamber 2426 is formed between the chamber frame 2422, the actuation body 2423, and the suspension sheet 2421a.

The insulation frame 2424 is stacked on the actuation body 2423. The appearance of the insulation frame 2424 is similar to the appearance of the chamber frame 2422. The conductive frame 2425 is stacked on the insulation frame 2424. The appearance of the conductive frame 2425 is similar to that of the insulation frame 2424. The conductive frame 2425 has a conductive frame pin 2425a and a conductive electrode 2425b. The conductive frame pin 2425a extends outwardly from the outer edge of the conductive frame 2425, and the conductive electrode 2425b extends inwardly from the inner edge of the conductive frame 2425. Moreover, the actuation body 2423 further includes a piezoelectric carrier plate 2423a, an adjusting resonance plate 2423b, and a piezoelectric plate 2423c. The piezoelectric carrier plate 2423a is stacked on the chamber frame 2422. The adjusting resonance plate 2423b is stacked on the piezoelectric carrier plate 2423a. The piezoelectric plate 2423c is stacked on the adjusting resonance plate 2423b. The adjusting resonance plate 2423b and the piezoelectric plate 2423c are accommodated in the insulation frame 2424. The conductive electrode 2425b of the conductive frame 2425 is electrically connected to the piezoelectric plate 2423c. The piezoelectric carrier plate 2423a and the adjusting resonance plate 2423b are both made of the same conductive material or different conductive materials. The piezoelectric carrier plate 2423a has a piezoelectric pin 2423d. The piezoelectric pin 2423d and the conductive frame pin 2425a are in electrical connection with a driving circuit (not shown) of the driving circuit board 243 so as to receive a driving signal (a driving frequency and a driving voltage). The piezoelectric pin 2423d, the piezoelectric carrier plate 2423a, the adjusting resonance plate 2423b, the piezoelectric plate 2423c, the conductive electrode 2425b, the conductive frame 2425, and the conductive frame pin 2425a may together form a circuit loop for transmitting the driving signal, and the insulation frame 2424 is provided for electrically isolating the conductive frame 2425 from the actuation body 2423 for avoiding short circuit, thereby the driving signal can be transmitted to the piezoelectric plate 2423c. When the piezoelectric plate 2423c receives the driving signal (a driving frequency and a driving voltage), the piezoelectric plate 2423c deforms owing to the piezoelectric effect, and thus the piezoelectric carrier plate 2423a and the adjusting resonance plate 2423b are driven to perform reciprocating vibration correspondingly.

As mentioned above, the adjusting resonance plate 2423b is disposed between the piezoelectric plate 2423c and the piezoelectric carrier plate 2423a as a buffering element, so as to adjust the vibration frequency of the piezoelectric carrier plate 2423a. Generally, the thickness of the adjusting resonance plate 2423b is greater than the thickness of the piezoelectric carrier plate 2423a. The thickness of the adjusting resonance plate 2423b may be changed to adjust the vibration frequency of the actuation body 2423.

Please refer to FIG. 12A, FIG. 12B, and FIG. 13A. The nozzle plate 2421, the chamber frame 2422, the actuation body 2423, the insulation frame 2424, and the conductive frame 2425 are sequentially stacked and assembled with each other and are disposed in the gas-guiding component loading region 2415, so that the piezoelectric actuation element 242 is placed and positioned in the gas-guiding component loading region 2415. The bottom of the piezoelectric actuation element 242 is supported and positioned by the positioning bumps 2415b, so that a surrounding gap 2421c is defined between the suspension sheet 2421a and the inner edge of the gas-guiding component loading region 2415 for gas to pass therethrough.

Please refer to FIG. 13A first. A gas flow chamber 2427 is formed between a bottom of the nozzle plate 2421 and the bottom surface of the gas-guiding component loading region 2415. The gas flow chamber 2427 is in communication with, through the hollow hole 2421b of the nozzle plate 2421, the resonance chamber 2426 formed between the actuation body 2423, the chamber frame 2422, and the suspension sheet 2421a. Through controlling the vibration frequency of the gas in the resonance chamber 2426, and makes the vibration frequency of the gas in the resonance chamber 2426 nearly the same with the vibration frequency of the suspension sheet 2421a, the resonance chamber 2426 and the suspension sheet 2421a can generate the Helmholtz resonance effect so as to improve the gas transmission efficiency.

Figure 13B:
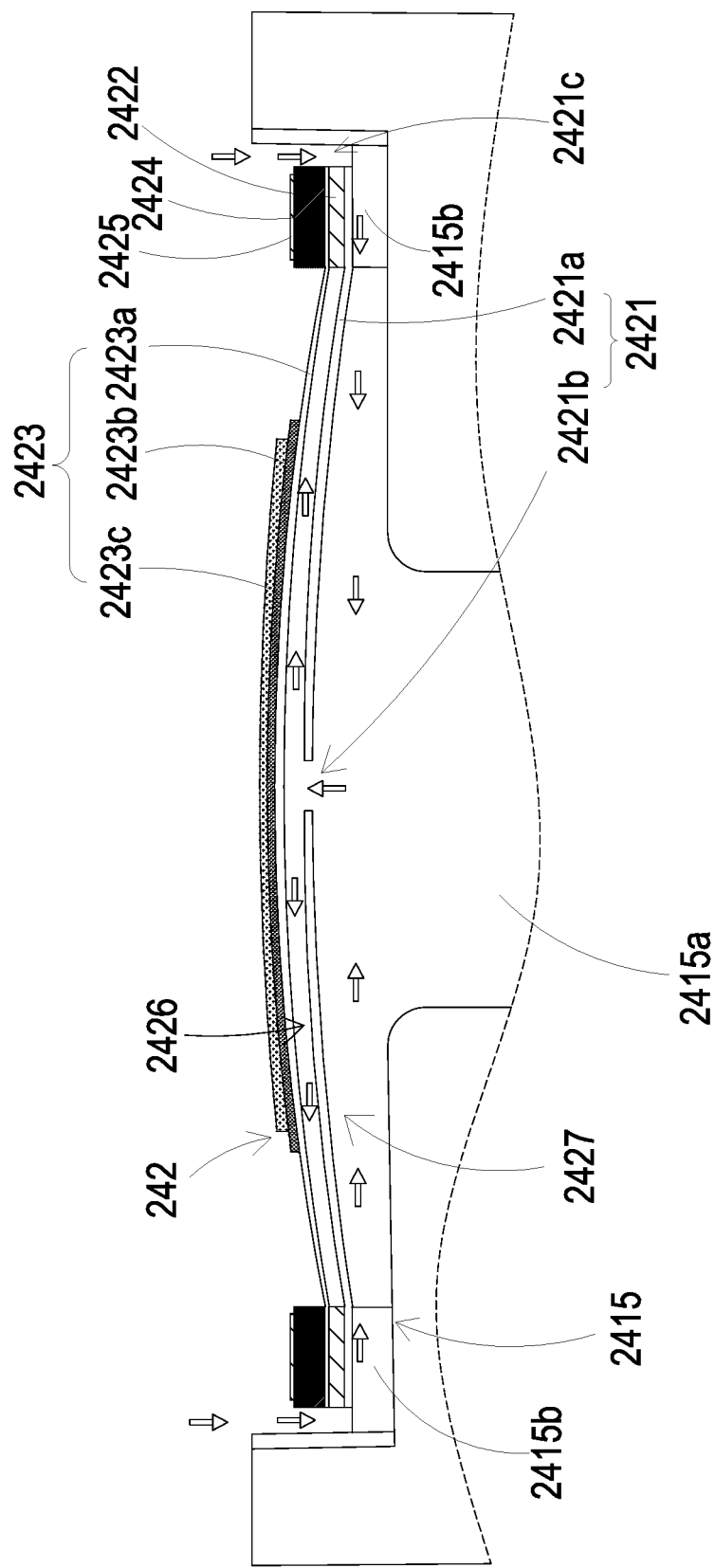
FIG. 13B and FIG. 13C illustrate schematic cross-sectional views showing the piezoelectric actuation member shown in FIG. 13A at different operation steps.
Figure 13C:
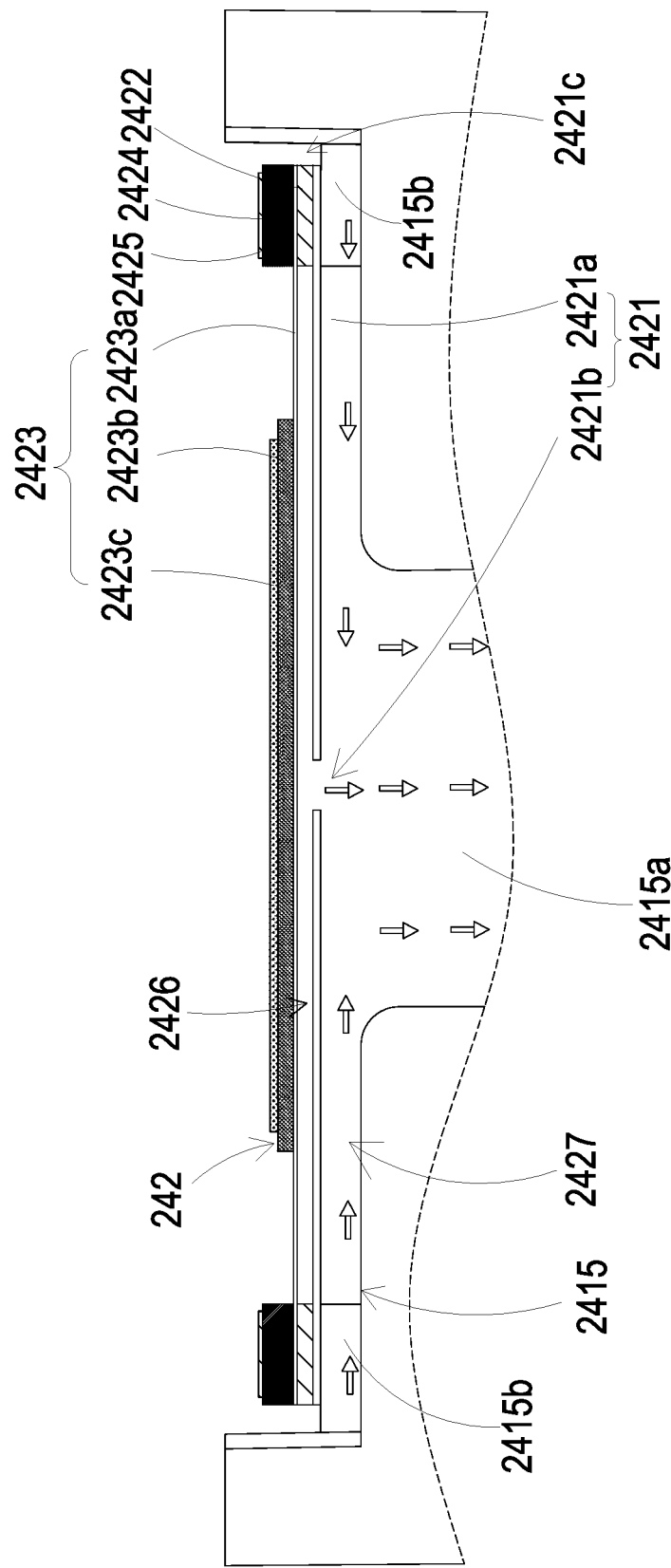

Please refer to FIG. 13B. When the piezoelectric plate 2423c bends away from the bottom surface of the gas-guiding component loading region 2415, the suspension sheet 2421a of the nozzle plate 2421 is driven by the piezoelectric plate 2423c to bend toward the direction away from the bottom surface of the gas-guiding component loading region 2415 correspondingly. Hence, the volume of the gas flow chamber 2427 expands dramatically, so that the internal pressure of the gas flow chamber 2427 decreases and which results in negative pressure, thereby drawing the gas outside the piezoelectric actuation element 242 to flow into the piezoelectric actuation element 242 through the surrounding gap 4212. The gas further enters into the resonance chamber 2426 through the hollow hole 2421b, thereby increasing the gas pressure in the resonance chamber 2426 and thus generating a pressure gradient. Further, as shown in FIG. 13C, when the piezoelectric plate 2423c drives the suspension sheet 2421a of the nozzle plate 2421 to move toward the bottom surface of the gas-guiding component loading region 2415, the gas inside the resonance chamber 2426 is pushed to flow out quickly through the hollow hole 2421b so as to further push the gas inside the gas flow chamber 2427, and make the converged gas eject into the bottom through hole of the gas-guiding component loading region 2415 quickly and massively in a state closing to an ideal gas state under the Benulli's law. Therefore, by repeating the steps as shown in FIG. 13B and FIG. 13C, the piezoelectric plate 2423c can bend and vibrate reciprocatingly. Further, after the gas is discharged out of the resonance chamber 2426, the internal pressure of the resonance chamber 2426 is lower than the equilibrium pressure due to the inertia, thereby guiding the gas outside the resonance chamber 2426 into the resonance chamber 2426 again. Thus, through controlling the vibration frequency of the gas inside the resonance chamber 2426 to be nearly the same with the vibration frequency of the piezoelectric plate 2423c to generate the Helmholtz resonance effect, high-speed and large-volume gas transmission can be achieved.

Moreover, as shown in FIG. 14A, the gas enters into the gas detection main body 4 from the gas inlet opening 2461a of the outer cap 246, passes through the gas inlet through hole 2414a and enters into the gas inlet groove 2414 of the base 241, and flows to the particulate sensor 245. As shown in FIG. 11B, the piezoelectric actuation element 242 continuously draws the gas in the gas inlet path so as to facilitate the gas outside the gas detection main body 24b to be guided inside quickly and to pass stably through the particulate sensor 245. At the same time, the light beam emitted by the laser component 244 passes through the light permissive window 2414b and enters into the gas inlet groove 2414. The suspended particulate in the gas in the gas inlet groove 2414 passing over the particulate sensor 245 are illuminated by the light beam. When the illuminated light beam encounters the suspended particulate in the gas, the light beam will be scattered to generate light spots. The particulate sensor 245 receives and calculates the light spots generated by the scattering, such that the particulate sensor 245 obtains the particle size and the concentration of the suspended particulate and other related information in the gas. And, the gas passing over the particulate sensor 245 is continuously guided into the gas flowing hole 2415a of the gas-guiding component loading region 2415 by the piezoelectric actuation element 242 and enters into the first region 2416b of the gas outlet groove 2416. Last, as shown in FIG. 14C, after the gas enters into the first region 2416b of the gas outlet groove 2416, since the piezoelectric actuation element 242 continuously delivers the gas into the first region 2416b, the gas in the first region 2416b is pushed toward to the second region 2416c, and eventually discharged out of the gas detection main body 24b through the gas outlet through hole 2416a and the gas outlet opening 2461b.

Figure 15:
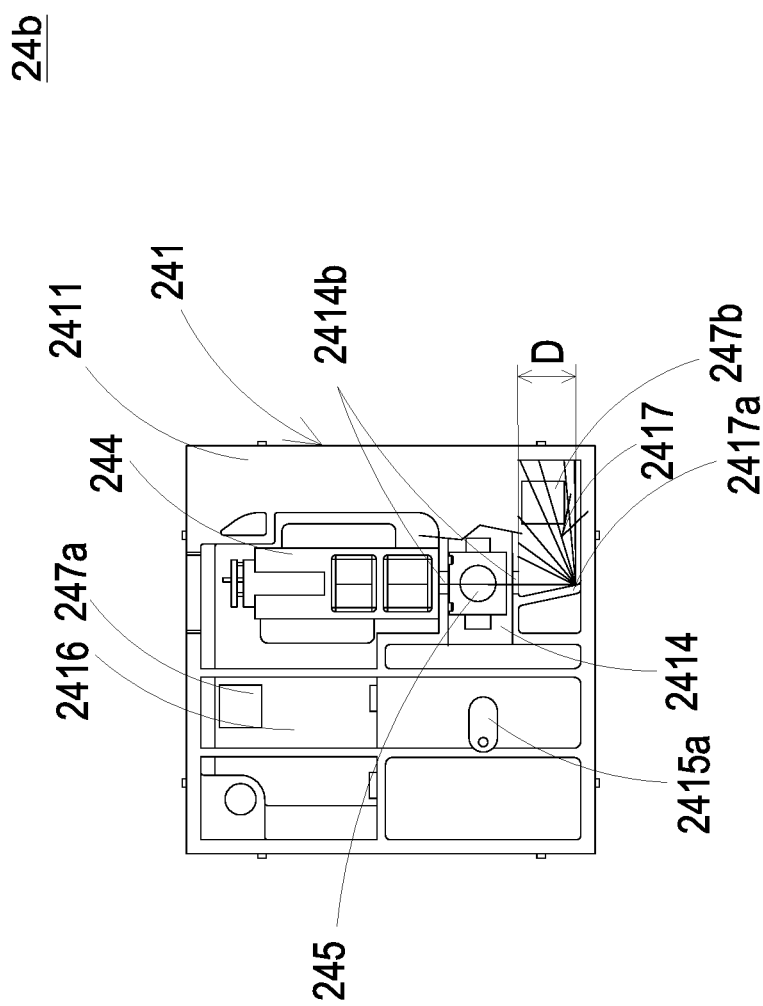
FIG. 15 illustrates a schematic cross-sectional view showing the laser beams emitted by the laser component of the gas detection main body according to the exemplary embodiment of the present disclosure.
Figure 16:
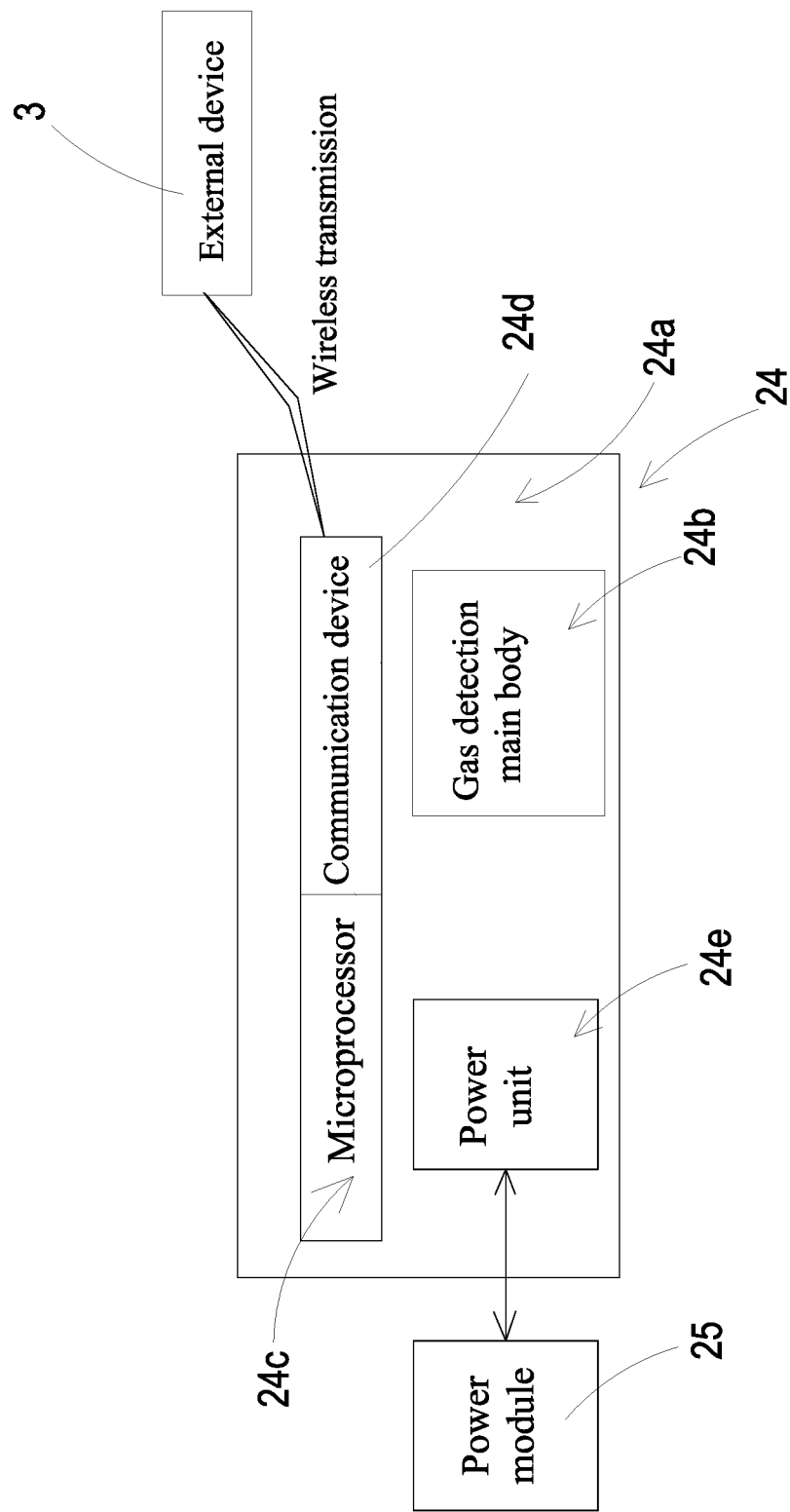
FIG. 16 illustrates a block diagram showing the relationships between the control circuit board and other components of the miniature gas detection and purification device according to the exemplary embodiment of the present disclosure.

Please refer to FIG. 15. The base 241 further includes a light trap region 2417. The light trap region 2417 is formed by hollowing out the base 241 from the first surface 2411 toward the second surface 2412, and the light trap region 2417 is corresponding to the laser configuration region 2413. Moreover, the light beam emitted by the laser component 244 can be projected into the light trap region 2417 through the light permissive window 2414b. The light trap region 2417 has a light trap structure 2417a having an oblique cone surface, and the light trap structure 2417a is corresponding to the path of the light beam emitted by the laser component 244. Moreover, the light trap structure 2417a allows the light beam emitted by the laser component 244 to be reflected to the light trap region 2417 by the oblique cone surface of the light trap structure 2417a, thereby preventing the light beam from being reflected to the particulate sensor 245. Moreover, a light trap distance D is maintained between the light permissive window 2414b and the position where the light trap structure 2417a receives the light beam, thereby preventing stray light beams from being directly reflected to the particulate sensor 245 after the light beam projecting on the light trap structure 2417a is reflected, and thus causing the distortion of detection accuracy.

Please refer to FIG. 8C and FIG. 15. The gas detection module 24 according to one or some embodiments of the present disclosure is not only capable of detecting the particles in the gas, but also capable of detecting other features of the guided gas. For example, in some embodiments, the gas may be formaldehyde, ammonia, carbon monoxide, carbon dioxide, oxygen, ozone, and so on. Therefore, in one or some embodiments of the present disclosure, the structure of the gas detection module 24 further includes a first volatile organic compound sensor 247a. The first volatile organic compound sensor 247a is disposed on the driving circuit board 243 and electrically connected to the driving circuit board 243, and is received in the gas outlet groove 2416 for detecting the gas guided out of the gas outlet path, so that the first volatile organic compound sensor 247a can be provided for detecting the concentration or the features of the volatile organic compound contained in the gas guided out of the gas outlet path. Alternatively, in one or some embodiments of the present disclosure, the structure of the gas detection module 24 further includes a second volatile organic compound sensor 247b. The second volatile organic compound sensor 247b is disposed on the driving circuit board 243 and electrically connected to the driving circuit board 243. The second volatile organic compound sensor 247b is received in the light trap region 2417, and the second volatile organic compound sensor 247b is provided for detecting the concentration or the features of the volatile organic compound contained in the gas passing through the gas inlet path of the gas inlet groove 2414 and guided into the light trap region 2417 through the light permissive window 2414b.

As mention above, the helmet provided in the present disclosure can be combined with a gas detection and purification device. The gas detection and purification device can detect and purify the gas, guide the purified gas into the helmet body, and discharge the purified gas to the nose portion and/or the mouth portion of the wearer so that the wearer can directly breath the purified gas. The gas detection module of the gas detection and purification device can detect the gas inside the helmet body to obtain a gas detection data, and control the gas-guiding unit to start or stop operation based on the gas detection data to perform a gas purification operation. The gas detection module further transmits the gas detection data to an external device, so that the external device can obtain information and a notification alert based on the gas detection data. Therefore, when the helmet is worn by a wearer, the gas can be detected and purified at anytime and anywhere, providing the wearer with the clean air to breathe.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A helmet, comprising:
a helmet body having a front edge portion corresponding to a nose portion and/or a mouth portion of a wearer;
a gas detection and purification device disposed on the front edge portion of the helmet body, wherein the gas detection and purification device comprises:
a body having at least one gas inlet, at least one gas outlet, and a gas channel disposed in the body, wherein the gas channel is disposed between the at least one gas inlet and the at least one gas outlet;
a purification module disposed in the gas channel of the body for filtering gas guided into the body from the gas channel;
a gas-guiding unit disposed in the gas channel of the body adjacent to one side of the purification module;
a gas detection module disposed in the body, wherein the gas detection module comprises a gas detection main body for detecting the gas guided into the body from the at least one gas inlet to obtain a gas detection data;
a power module disposed in the body and electrically connected to the gas detection module and the gas-guiding unit for providing actuation power;
wherein the gas detection module calculates the gas detection data obtained by the gas detection module so as to control the gas-guiding unit to start or stop operation based on the gas detection data, wherein when the gas-guiding unit is in operation, the gas-guiding unit guides the gas into the body from the at least one gas inlet and passes through the purification module for filtering and purifying, and the gas-guiding unit discharges purified gas out of the body from the at least one gas outlet to the nose portion and/or the mouth portion of the wearer for providing the wearer with the purified gas to breath; and
wherein the gas detection main body comprises:
a base, having;
a first surface;
a second surface opposite to the first surface;
a laser configuration region hollowed out from the first surface to the second surface;
a gas inlet groove recessed from the second surface and located adjacent to the laser configuration region, wherein the gas inlet groove has a gas inlet through hole and two lateral walls opposite each other, wherein a light permissive window penetrates the two lateral walls of the gas inlet groove, and is in communication with the laser configuration region;
a gas-guiding component loading region recessed from the second surface and in communication with the gas inlet groove, wherein a gas flowing hole penetrates a bottom of the gas-guiding component loading region, and each of four corners of the gas-guiding component loading region has a positioning bump; and
a gas outlet groove recessed from a portion of the first surface corresponding to the bottom surface of the gas-guiding component loading region, and hollowed out from the first surface to the second surface in a region where the first surface is not aligned with the gas-guiding component loading region, wherein the gas outlet groove is in communication with the gas flowing hole, and the gas outlet groove has a gas outlet through hole;
a piezoelectric actuation element received in the gas-guiding component loading region;
a driving circuit board attached to the second surface of the base;
a laser component disposed on the driving circuit board and electrically connected to the driving circuit board, wherein the laser component is received in the laser configuration region, and wherein a path of a light beam emitted by the laser component passes through the light permissive window and is orthogonal to the gas inlet groove;
a particulate sensor disposed on and electrically connected to the driving circuit board, wherein the particulate sensor is received in a position of the gas inlet groove where the path of the light beam emitted by the laser component is orthogonal thereto, so that the particulate sensor detects particulates passing through the gas inlet groove and illuminated by the light beam of the laser component; and
an outer cap covering the first surface of the base, wherein the outer cap has a side plate, and wherein a portion of the side plate corresponding to the gas inlet through hole of the base has a gas inlet opening and another portion of the side plate corresponding to the gas outlet through hole of the base has a gas outlet opening, the gas inlet opening corresponds to the at least one gas inlet of the body, and the gas outlet opening corresponds to the at least one gas outlet of the body;
wherein the outer cap is covered on the first surface of the base, and the driving circuit board is covered on the second surface of the base, so that the gas inlet groove defines a gas inlet path and the gas outlet groove defines a gas outlet path, thereby facilitating the piezoelectric actuation element to guide the gas out of the at least one gas inlet of the body into the gas inlet path defined by the gas inlet groove from the gas inlet opening, pass through the particulate sensor for the particulate sensor to detects a particle concentration of the gas, and discharge the gas transmitted by the piezoelectric actuation element into the gas outlet path defined by the gas outlet groove from the gas flowing hole and out of the gas detection main body from the gas outlet through hole and the at least one gas outlet of the body.

2. The helmet according to claim 1, wherein the purification module comprises a filtering unit.

3. The helmet according to claim 2, wherein the filter unit is one of an electrostatic filter, an activated carbon filter, and a high-efficiency particulate air (HEPA) filter.

4. The helmet according to claim 2, wherein the filter unit is coated with a cleansing element containing chlorine dioxide for suppressing viruses and bacteria in the gas.

5. The helmet according to claim 2, wherein the filter unit is coated with a herbal protection coating layer having *Rhus chinensis* Mill extracts and *Ginkgo biloba* extracts to form a herbal protection anti-allergy filter for performing an anti-allergy function and destroying cell surface proteins of influenza viruses passing through the herbal protection anti-allergy filter.

6. The helmet according to claim 2, wherein the filter unit is coated with silver ions for suppressing viruses and bacteria in the gas.

7. The helmet according to claim 2, wherein the purification module further comprises a photocatalyst unit, wherein the photocatalyst unit comprises a photocatalyst and an ultraviolet light, and the photocatalyst is illuminated with the ultraviolet light so as to degrade the gas guided into the gas detection and purification device, thereby filtering and purifying the gas.

8. The helmet according to claim 2, wherein the purification module further comprises a photo plasma unit, wherein the photo plasma unit comprises a nanometer optical tube, and the gas is illuminated with a light emitted from the nanometer optical tube to degrade volatile organic gases in the gas.

9. The helmet according to claim 2, wherein the purification module further comprises a negative ion unit, wherein the negative ion unit comprises at least one electrode wire, at least one dust-collecting plate, and a boost power supply, wherein the at least one electrode wire discharges electricity under a voltage, so that particulates in the gas guided into the gas detection and purification device are adhered on the dust-collecting plate, and the gas is filtered and purified.

10. The helmet according to claim 2, wherein the purification module further comprises a plasma ion unit, wherein the plasma ion unit comprises an electric-field upper protection mesh, an absorbing mesh, a voltage discharge electrode, an electric-field lower protection mesh, and a boost power supply, and wherein the boost power supply provides the voltage discharge electrode with a voltage so as to generate a voltage plasma column.

11. The helmet according to claim 1, wherein the gas-guiding unit is a fan.

12. The helmet according to claim 1, wherein the gas-guiding unit is an actuation pump, and the actuation pump comprises:
an inlet plate having at least one inlet hole, at least one convergence channel, and a convergence chamber, wherein the at least one inlet hole is used to introduce the gas, the at least one inlet hole correspondingly penetrates to the at least one convergence channel, and the at least one convergence channel is converged at the convergence chamber, so that the gas introduced from the at least one inlet hole is converged at the convergence chamber;
a resonance sheet attached to the inlet plate, wherein the resonance sheet has a perforation, a movable portion, and a fixed portion, wherein the perforation is located at a center portion of the resonance sheet and corresponds to the convergence chamber of the inlet plate, the movable portion is disposed at a periphery of the perforation and is disposed at a portion corresponding to the convergence chamber, and the fixed portion is disposed at an outer periphery of the resonance sheet and attached to the inlet plate; and
a piezoelectric actuator attached on the resonance sheet and disposed correspondingly to the resonance sheet;
wherein a chamber space is formed between the resonance sheet and the piezoelectric actuator, so that when the piezoelectric actuator is driven, the gas outside the actuation pump is introduced into the actuation pump through the at least one inlet hole of the inlet plate, converged at the convergence chamber via the at least one convergence channel, and flowed through the perforation of the resonance sheet by a resonance effect resulting between the piezoelectric actuator and the movable portion of the resonance sheet.

13. The helmet according to claim 12, wherein the piezoelectric actuator comprises:
a suspension plate in square shape and capable of bending and vibrating;
an outer frame disposed around a periphery of the suspension plate;
at least one supporting element connected between the suspension plate and the outer frame to provide a flexible support for the suspension plate; and
a piezoelectric element having a side length, wherein the side length of the piezoelectric element is smaller than or equal to a side length of the suspension plate, and the piezoelectric element is attached to a surface of the suspension plate.

14. The helmet according to claim 1, wherein the gas detection module further comprises a control circuit board, a microprocessor, a communication device, and a power unit, wherein the gas detection main body, the microprocessor, the communication device, and the power unit are packaged with the control circuit board, so that the gas detection main body, the microprocessor, the communication device, and the power unit are integrated with and electrically connected to the control circuit board, wherein the power unit is electrically connected to the power module for providing the gas detection main body with power for operation, and the gas detection main body detects the guided gas inside the body so as to obtain the gas detection data, wherein the microprocessor receives the gas detection data and calculates the gas detection data and to control the gas-guiding unit to start or stop operation, wherein the communication device receives the gas detection data from the microprocessor and transmits the gas detection data to an external device, and the external device obtains information and a notification alert based on the gas detection data, and wherein the external device is a mobile device or a cloud processing device.

15. The helmet according to claim 1, wherein the base further comprises a light trap region, wherein the light trap region is formed by hollowing out the base from the first surface toward the second surface, and the light trap region is corresponding to the laser configuration region, wherein light trap region has a light trap structure having an oblique cone surface, and the light trap structure is corresponding to the path of the light beam emitted by the laser component.

16. The helmet according to claim 15, wherein the gas detection main body comprises a second volatile organic compound sensor, wherein the second volatile organic compound sensor is disposed on and electrically connected to the driving circuit board, and the second volatile organic compound sensor is received in the light trap region, and the second volatile organic compound sensor detects the gas passing through the gas inlet path of the gas inlet groove and guided into the light trap region through the light permissive window.

17. The helmet according to claim 1, wherein the particulate sensor is a PM2.5 sensor.

18. The helmet according to claim 1, wherein the piezoelectric actuation element comprises:
   a nozzle plate comprising a suspension sheet and a hollow hole, wherein the suspension sheet is capable of bending and vibrating, and the hollow hole is formed at a center portion of the suspension sheet;
   a chamber frame stacked on the suspension sheet;
   an actuation body stacked on the chamber frame so as to bend and vibrate reciprocatingly when the actuation body is applied with a voltage;
   an insulation frame stacked on the actuation body; and
   a conductive frame stacked on the insulation frame;
   wherein the nozzle plate is positioned at the gas-guiding component loading region through the four positioning bumps, so that a surrounding gap is defined between the nozzle plate and an inner edge of the gas-guiding component loading region for the gas to flow therethrough, a gas flow chamber is formed between a bottom of the nozzle plate and the bottom of the gas-guiding component loading region, and a resonance chamber is formed between the actuation body, the chamber frame, and the suspension sheet, and wherein resonance effect of the nozzle plate is driven by driving the actuation body, so as to make the suspension sheet of the nozzle plate vibrate reciprocatingly, and thus the gas enters into the gas flow chamber through the surrounding gap and then discharges out of the gas flow chamber, thereby transmitting the gas.

19. The helmet according to claim 1, wherein the gas detection main body comprises a first volatile organic compound sensor, wherein the first volatile organic compound sensor is disposed on and electrically connected to the driving circuit board, and the first volatile organic compound sensor is received in the gas outlet groove for detecting the gas guided out of the gas outlet path.

* * * * *